US011859894B2

(12) United States Patent
Yu et al.

(10) Patent No.: US 11,859,894 B2
(45) Date of Patent: Jan. 2, 2024

(54) REFRIGERATOR

(71) Applicant: SAMSUNG ELECTRONICS CO., LTD., Suwon-si (KR)

(72) Inventors: Jinhong Yu, Suwon-si (KR); Youngmin You, Suwon-si (KR); Sungmo Kim, Suwon-si (KR); Jinyoung Song, Suwon-si (KR); Inyong Hwang, Suwon-si (KR); Jisick Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

(21) Appl. No.: 17/341,799

(22) Filed: Jun. 8, 2021

(65) Prior Publication Data

US 2021/0396450 A1    Dec. 23, 2021

(30) Foreign Application Priority Data

Jun. 17, 2020    (KR) .................. 10-2020-0073838

(51) Int. Cl.
  *F25D 17/06*    (2006.01)
  *F25D 13/04*    (2006.01)
  *F25B 39/02*    (2006.01)

(52) U.S. Cl.
  CPC ............ *F25D 17/065* (2013.01); *F25B 39/02* (2013.01); *F25D 13/04* (2013.01)

(58) Field of Classification Search
  CPC ........ F25D 17/065; F25D 13/04; F25D 11/02; F25D 17/04; F25D 17/06; F25D 23/12; F25D 25/02; F25D 31/00; F25B 39/02
  See application file for complete search history.

(56) References Cited

U.S. PATENT DOCUMENTS

| 8,997,517 B2 | 4/2015 | Bertolini et al. |
| 9,823,008 B2 | 11/2017 | Bertolini et al. |
| (Continued) | | |

FOREIGN PATENT DOCUMENTS

| CN | 102706069 B | 12/2014 |
| JP | 2002-188877 | 7/2002 |
| (Continued) | | |

OTHER PUBLICATIONS

JP-2006145094-A translation.*

(Continued)

*Primary Examiner* — Elizabeth J Martin
(74) *Attorney, Agent, or Firm* — STAAS & HALSEY LLP

(57) ABSTRACT

Disclosed is a refrigerator including a temperature controlled room with improved utilization of space because no component for cooling or heating is positioned inside a temperature controlled room. The refrigerator includes a cabinet; a storage room provided inside the cabinet; a temperature controlled room positioned inside the storage room and being at inside temperature which is independent from inside temperature of the storage room; a cool air flow path guiding cool air generated inside the cabinet to inside of the storage room; a first fan positioned on the cool air flow path to supply the cool air to the storage room; a cool air supplier forming at least one portion of the cool air flow path and including a second fan to supply the cool air to the temperature controlled room; and a heating portion configured to heat air to supply hot air to inside of the temperature controlled room.

20 Claims, 22 Drawing Sheets

(56) References Cited

U.S. PATENT DOCUMENTS

| | | |
|---|---|---|
| 2004/0107726 A1 | 6/2004 | Kim et al. |
| 2008/0302125 A1 | 12/2008 | Cushman et al. |
| 2009/0193826 A1* | 8/2009 | Yasugi ............. F25D 23/12 62/159 |
| 2012/0266617 A1 | 10/2012 | Lee et al. |
| 2014/0290302 A1* | 10/2014 | Shin ............. F25D 11/022 62/419 |

FOREIGN PATENT DOCUMENTS

| | | | | |
|---|---|---|---|---|
| JP | 2006-145094 A | | 6/2006 | |
| JP | 2006145094 A | * | 6/2006 | ......... F25D 11/02 |
| JP | 2007-101084 A | | 4/2007 | |
| JP | 2008-106993 A | | 5/2008 | |
| JP | 2009-229018 | | 10/2009 | |
| JP | 4502998 B2 | | 7/2010 | |
| KR | 10-2005-0014524 A | | 2/2005 | |
| KR | 10-2007-0016319 A | | 2/2007 | |
| KR | 10-2007-0024021 A | | 3/2007 | |
| KR | 10-0725495 B1 | | 6/2007 | |
| KR | 10-0861347 B1 | | 10/2008 | |
| KR | 10-1210148 B1 | | 12/2012 | |
| KR | 10-2019-0092021 A | | 8/2019 | |
| WO | WO 2007/023593 A1 | | 3/2007 | |
| WO | WO 2019/165520 A1 | | 9/2019 | |

OTHER PUBLICATIONS

International Search Report dated Sep. 10, 2021, for Application No. PCT/KR2021/007016.

Office Action dated Jun. 12, 2023 issued in European Search Report in Application No. EP 21 82 6260.

* cited by examiner

REFRIGERATOR

CROSS-REFERENCE TO RELATED APPLICATION

This application is based on and claims priority under 35 U.S.C. § 119 to Korean Patent Application No. 10-2020-0073838, filed on Jun. 17, 2020, in the Korean Intellectual Property Office, the disclosure of which is incorporated by reference herein in its entirety.

BACKGROUND

1. Field

The disclosure relates to a refrigerator including a temperature controlled room of which temperature is controllable independently from temperature of a storage room.

2. Description of the Related Art

A refrigerator is an appliance including a storage room for storing foods and a cool air supplier for supplying cool air to the storage room to keep foods fresh. The storage room includes a refrigerating room that is maintained at about 0° C. to 5° C. to keep foods refrigerated and a freezing room that is maintained at about 0° C. to 30° C. below zero to keep foods frozen.

Refrigerators are classified according to the positions of the refrigerating rooms and freezing rooms and the types of doors. That is, refrigerators are classified into a Bottom Mounted Freezer (BMF) type in which a freezing room is disposed below a refrigerating room, a Top Mounted Freezer (TMF) type in which a freezing room is disposed above a refrigerating room, and a Side By Side (SBS) type in which a freezing room is disposed to the left of a refrigerating room. Also, BMF type refrigerators include a French Door Refrigerator (FDR) type in which a pair of refrigerating room doors for opening and closing a refrigerating room are provided, and a 4 Door type in which a pair of refrigerating room doors for opening and closing a refrigerating room and a pair of freezing room doors for opening and closing a freezing room are provided.

A refrigerator including a temperature controlled room of which inside temperature is controllable to temperature that is different from that of a storage room has been developed.

SUMMARY

Aspects of the disclosure will be set forth in part in the description which follows and, in part, will be obvious from the description, or may be learned by practice of the disclosure.

In accordance with an embodiment of the disclosure, a refrigerator includes: a cabinet; a storage room provided inside the cabinet; a temperature controlled room positioned inside the storage room and being at inside temperature which is independent from inside temperature of the storage room; a cool air flow path guiding cool air generated inside the cabinet to inside of the storage room; a first fan positioned on the cool air flow path to supply the cool air to the storage room; a cool air supplier forming at least one portion of the cool air flow path and including a second fan to supply the cool air to the temperature controlled room; and a heating portion configured to heat air to supply hot air to inside of the temperature controlled room.

The cool air supplier may be spaced a preset distance from a rear side of the storage room.

The refrigerator may further include a heat exchanger positioned inside the storage room and configured to generate cool air.

The cool air supplier may be positioned in front of the heat exchanger.

The first fan may be positioned above the heat exchanger.

The second fan may be positioned in front of the heat exchanger.

The cool air supplier may further include a cool air supply flow path through which cool air of the cool air flow path is guided to the temperature controlled room.

One end of the cool air supply flow path may be connected to the cool air flow path, and the other end of the cool air supply flow path may be connected to the temperature controlled room.

The heating portion may be positioned on a bottom of the storage room.

The refrigerator may further include: a case forming the temperature controlled room; and a drawer that is put into or withdrawn from the case.

The second fan may be positioned outside the case.

The case and the drawer may be separable from the storage room.

The drawer may be spaced a preset distance from the heating portion such that the drawer is not in contact with the heating portion.

The case may further include a heater hole formed in a bottom of the case and corresponding to the heating portion.

The heating portion may be inserted in the heater hole to reduce a distance to the temperature controlled room.

The temperature controlled room may include a first temperature controlled room and a second temperature controlled room, wherein the second temperature controlled room may be partitioned from the first temperature controlled room and inside temperature of the second temperature controlled room is different from inside temperature of the first temperature controlled room.

The cool air supplier may include a plate portion forming at least one portion of the cool air flow path and spaced a preset distance from one surface of the storage room, and the second fan coupled with the plate portion to be positioned on an outer side of the cool air flow path.

The refrigerator may further include a case forming the temperature controlled room and including a case hole penetrating a rear side of the case.

The other end of the cool air supply flow path may be connected to the case hole.

In accordance with an embodiment of the disclosure, a refrigerator includes: a cabinet; a storage room provided inside the cabinet; a temperature controlled room positioned inside the storage room and being at inside temperature which is controllable independently from inside temperature of the storage room; a heat exchanger positioned inside the cabinet and configured to generate cool air; a cool air supplier configured to supply the cool air generated by the heat exchanger to the temperature controlled room; and a heating portion positioned below the temperature controlled room and configured to heat air.

The refrigerator may further include a first fan configured to supply the cool air to the storage room.

The cool air supplier may include a second fan configured to supply the cool air to the temperature controlled room.

The cool air supplier may cover a front portion of the heat exchanger to partition the heat exchanger from the storage room.

The heating portion and the second fan may be positioned outside the temperature controlled room.

The cool air supplier may further include a cool air supply flow path through which the cool air generated by the heat exchanger is guided to the temperature controlled room.

One end of the cool air supply flow path may be connected to a front portion of the heat exchanger, and the other end of the cool air supply flow path may be connected to the temperature controlled room.

The refrigerator may further include: a case forming the temperature controlled room; and a drawer that is put into or withdrawn from the case.

The case may further include a heater hole formed in a bottom of the case and corresponding to the heating portion.

The heating portion may be inserted in the heater hole to reduce a distance to the temperature controlled room.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
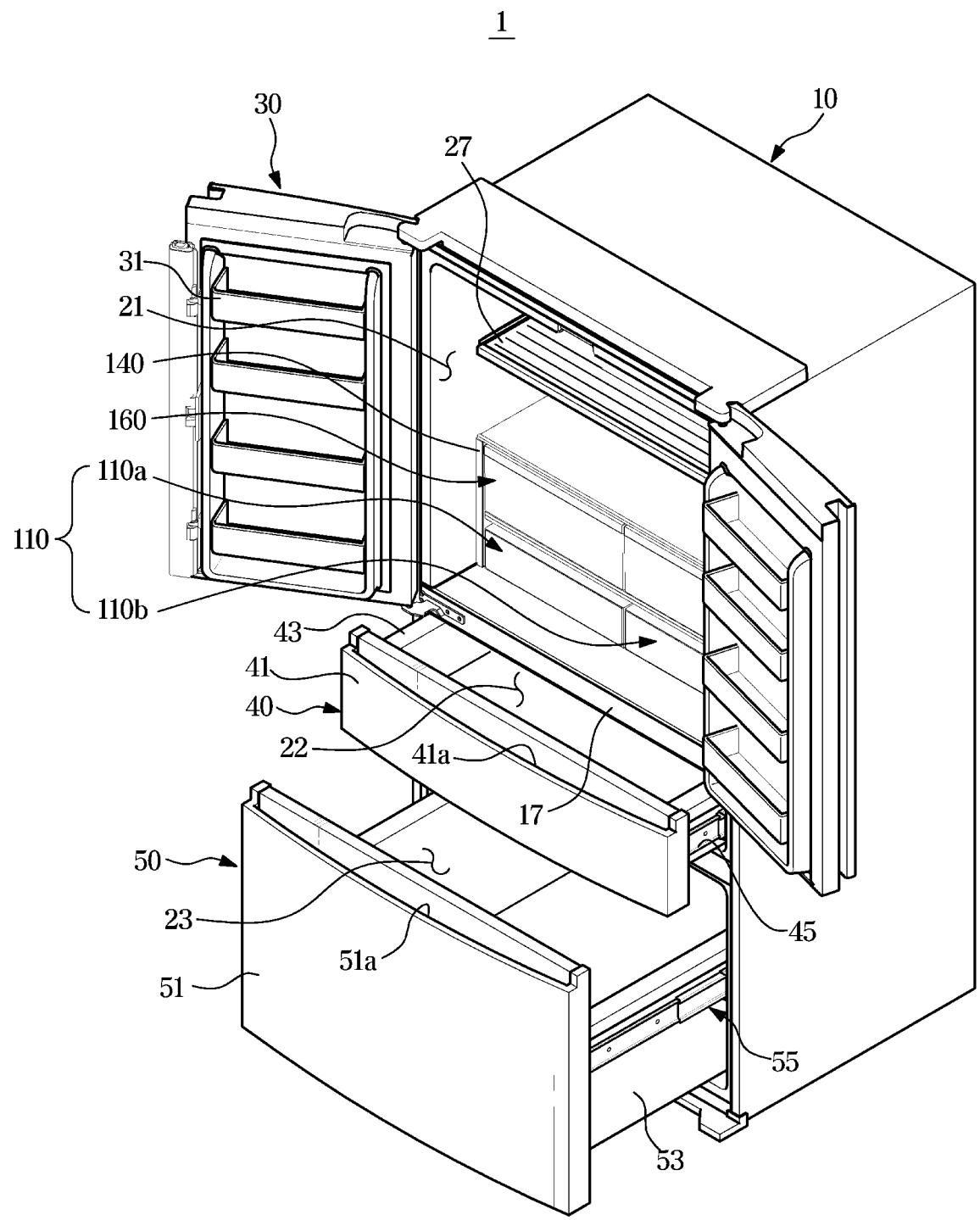
FIG. 1 is a perspective view of a refrigerator according to an embodiment of the disclosure.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

The terms used in the present specification are used to describe the embodiments of the disclosure, not for the purpose of limiting and/or restricting the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be understood that, although the terms "first", "second", etc., may be used herein to describe various components, these components should not be limited by these terms. The above terms are used only to distinguish one component from another. For example, a first component discussed below could be termed a second component, and similarly, a second component may be termed a first component without departing from the teachings of this disclosure. As used herein, the term "and/or" includes any and all combinations of one or more of the associated listed items.

In the following description, the terms "front", "rear", "left", "right", etc. are defined based on the drawings, and the shapes and positions of the corresponding components are not limited by the terms.

Throughout the disclosure, the expression "at least one of a, b or c" indicates only a, only b, only c, both a and b, both a and c, both b and c, all of a, b, and c, or variations thereof.

It is an aspect of the disclosure to provide a refrigerator with a wide controllable temperature range, while having high power efficiency because of using no thermoelectric device in implementing a temperature controlled room.

It is another aspect of the disclosure to provide a refrigerator including a temperature controlled room with improved utilization of space because no component for cooling or heating is positioned inside the temperature controlled room.

It is another aspect of the disclosure to provide a refrigerator separately including a fan for supplying cool air to inside of a storage room and a fan for supplying cool air to inside of a temperature controlled room to quickly cool the inside of the temperature controlled room.

It is another aspect of the disclosure to provide a refrigerator including a plurality of temperature controlled rooms to keep various foods at optimal temperature.

Hereinafter, embodiments of the present disclosure will be described in detail with reference to the accompanying drawings.

Figure 2:
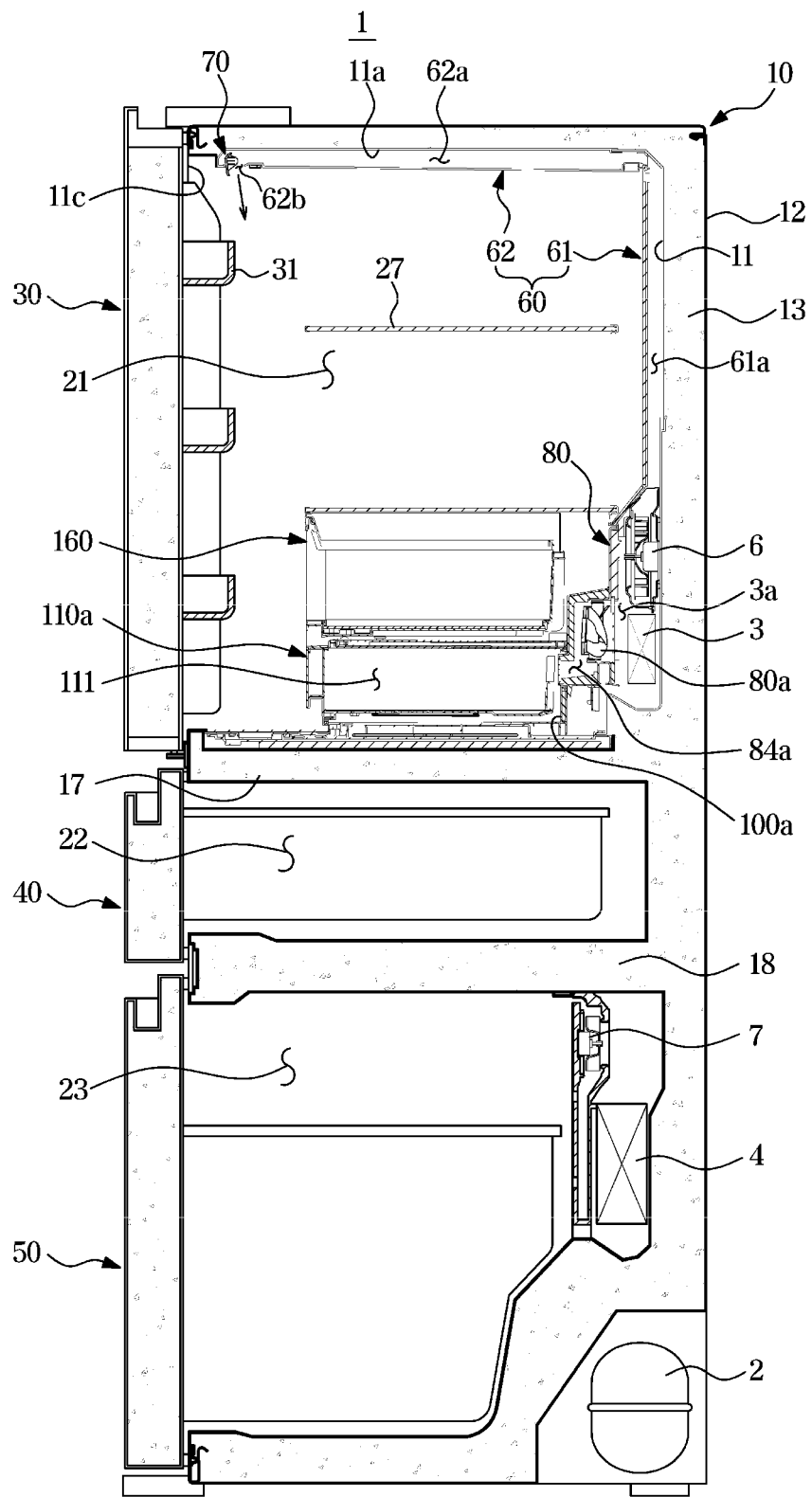
FIG. 2 is a schematic side cross-sectional view of the refrigerator shown in FIG. 1.

FIG. 1 is a perspective view of a refrigerator according to an embodiment of the disclosure. FIG. 2 is a schematic side cross-sectional view of the refrigerator shown in FIG. 1.

Referring to FIGS. 1 and 2, a refrigerator 1 may include a main body 10 including a plurality of storage rooms 21, 22, and 23, a plurality of doors 30, 40, and 50 for opening and closing the storage rooms 21, 22, and 23, and a cool air generator for supplying cool air to the storage rooms 21, 22, and 23.

The main body 10 may include an inner case 11 forming the storage rooms 21, 22, and 23, an outer case 12 coupled with an outer side of the inner case 11, and an insulation 13 provided between the inner case 11 and the outer case 12. The inner case 11 may be injection-molded with a plastic material, and the outer case 12 may be made of a metal material. The outer case 12 may also be referred to as a cabinet 12. The insulation 13 may be urethane foam insulation, and a vacuum insulation panel may be used together with the urethane foam insulation as necessary. The main body 10 may include a plurality of middle walls 17 and 18 partitioning the storage rooms 21, 22, and 23 up and down. The storage rooms 21, 22, and 23 may include a first storage room 21, a second storage room 22, and a third storage room 23. The inner case 11 may further include a upper plate 11a, a rear plate 11b, side plates, and a front plate 11c.

The storage rooms 21, 22, and 23 may be used as a refrigerating room that is maintained at about 0° C. to 5° C. to keep foods refrigerated, and a freezing room that is maintained at about 0° C. to 30° C. below zero to keep foods frozen.

Front sides of the storage rooms 21, 22, and 23 may open to put food in or take food out, and the open front sides of the storage rooms 21, 22, and 23 may be opened or closed by the doors 30, 40, and 50. In the storage rooms 21, 22, and 23, a rack 27 on which food is placed may be provided.

In the first storage room 21, a drawer 110 may be provided. The drawer 110 may include a first drawer 110a and a second drawer 110b that are arranged side by side. The first drawer 110a and the second drawer 110b may have the same size, although not limited thereto. Also, the number and arrangement of the drawer 110 may change. A single drawer 110 or three drawers 110 or more may be provided. Also, a plurality of drawers 110 may be arranged up and down.

The drawer 110 may be in a shape of a parallelepiped of which an upper side opens. The drawer 110 may have a storage space 11 to accommodate food. Various foods may be stored in the storage space 111. For example, meat, vegetables, wine, etc. may be stored in the storage space 111.

In the first storage room 21, a case 130 (see FIG. 4) for accommodating the drawer 110 may be provided. The case 130 may be in a shape of a parallelepiped of which a front side opens. The drawer 110 may be put into or withdrawn from the case 130 through the open front side of the case 130.

The case 130 may form a temperature controlled room 100 therein. The drawer 110 may be put in the case 130 to be accommodated in the temperature controlled room 100. By accommodating the drawer 110 in the temperature controlled room 100, the storage space 111 may be located in the temperature controlled room 100.

The temperature controlled room 100 may have inside temperature that is different from inside temperature of the first storage room 21. More specifically, the inside temperature of the temperature controlled room 100 may be lower or higher than the inside temperature of the first storage room 21. Also, the inside temperature of the temperature controlled room 100 may be the same as the inside temperature of the first storage room 21. However, generally, the inside temperature of the temperature controlled room 100 may be different from the inside temperature of the first storage room 21 according to a user's setting. The inside temperature of the temperature controlled room 100 may be set within a temperature range from −1.5° C. which is optimal temperature for keeping meat to 15° C. which is optimal temperature for keeping wine. However, the temperature controlled room 100 may have a wider temperature range than the temperature range.

According to an embodiment of the disclosure, a plurality of temperature controlled rooms 100 may be provided. As shown in FIG. 1, the temperature controlled room 100 may include a first temperature controlled room 100a and a second temperature controlled room 100b that are arranged side by side. Inside temperature of the first temperature controlled room 100a may be different from that of the second temperature controlled room 100b. To make the inside temperature of the first temperature controlled room 100a different from that of the second temperature controlled room 100b, separate heating portions 90 (see FIG. 3) may be respectively provided below the first temperature controlled room 100a and the second temperature controlled room 100b, respectively. Accordingly, as described herein, the separate heating portions 90 are operable to heat air to maintain or increase a temperature inside the temperature controlled room 100a and/or a temperature inside the temperature controlled room 100b. Also, a first fan 80a for supplying cool air to inside of the first temperature controlled room 100a and a second fan 80b for supplying cool air to inside of the second temperature controlled room 100b may be provided respectively. As described herein, the first fan 80a can be operated to maintain or decrease a temperature inside the temperature controlled room 100a, and the second fan 80b can be operated to maintain or decrease a temperature inside the temperature controlled room 100b. The first fan 80a and the second fan 80b will be described in detail, later.

In the first storage room 21, a storage container 160 may be provided. The storage container 160 may be withdrawn in a front direction. The storage container 160 may be positioned above the case 130. A plurality of storage containers 160 may be provided. As shown in FIG. 1, the storage container 160 may include a pair of storage containers having the same size. However, the storage container 160 may include a plurality of storage containers having different sizes. In this case, a user may change an arrangement of the storage containers 160 in various ways, which will be described in detail, later.

The doors 30, 40, and 50 may include a first door 30 for opening and closing the first storage room 21, a second door 40 for opening and closing the second storage room 22, and a third door 50 for opening and closing the third storage room 23.

The first door 30 may be coupled with the main body 10 in such a way to be rotatable in a left-right direction. On a rear side of the first door 30, a door guard 31 in which food is storable may be installed.

The second door 40 may slide to be put into or withdrawn from the inside of the second storage room 22, and include a door portion 41 covering the open front side of the second storage room 22 and a basket 43 coupled with a rear side of the door portion 41. The basket 43 may be slidably supported by a rail 45. In the door portion 41, a handle 41a may be provided.

The third door 50 may slide to be put into or withdrawn from the inside of the third storage room 23, and include a door portion 51 covering the open front side of the third storage room 23 and a basket 53 coupled with a rear side of the door portion 51. The basket 53 may be slidably supported by a rail 55. In the door portion 51, a handle 51a may be provided.

The cool air generator may generate cool air by using evaporative latent heat of a refrigerant through a cooling cycle. The cool air generator may include a compressor 2, a condenser, an expander, and an evaporator 3 and 4. The refrigerator 1 may include a ventilation fan 6 and 7 for causing cool air generated by the evaporator 3 and 4 to flow. The evaporator 3 and 4 is also referred to as a heat exchanger 3 and 4.

According to an embodiment of the disclosure, the refrigerator 1 may include the evaporator 3 and 4. The evaporator 3 and 4 may include a first evaporator 3 installed in the first storage room 21, and a second evaporator 4 installed in the third storage room 23. Also, the ventilation fan 6 and 7 may include a first ventilation fan 6 installed in the first storage room 21, and a second ventilation fan 7 installed in the third storage room 23, although not limited thereto. Although not shown in the drawings, the refrigerator 1 may include a single evaporator. In this case, a duct connecting a storage room in which the evaporator is installed to a storage room forming a temperature controlled room may be provided. Also, a flow path connected from the duct to the temperature controlled room may be provided, and a fan for causing inside air of the flow path to flow may be provided. Cool air generated by the evaporator may be supplied to the temperature controlled room by the fan via the duct and the flow path.

Hereinafter, for convenience of description, the first storage room 21 is referred to as a storage room 21. Also, the first evaporator 3 is referred to as an evaporator 3. Also, the first ventilation fan 6 is referred to as a ventilation fan 6.

The evaporator 3 may be positioned in a rear area of the storage room 21 to generate cool air. The evaporator 3 may be accommodated in a cooling chamber 3a formed by a cool air supplier 80.

In the cooling chamber 3a, the ventilation fan 6 for causing air to flow may be positioned to supply cool air to the storage room 21. The cooling chamber 3a may communicate with a guide cover 60 for guiding cool air of the cooling chamber 3a.

The guide cover 60 may include a discharge cover 61 positioned in the rear area of the storage room 21, and an upper cover 62 positioned in an upper area of the storage room 21.

The guide cover 60 may be spaced a preset distance from a rear side of the storage room 21 to form cool air flow paths 61a and 62a. Cool air may pass through the cool air flow paths 61a and 62a and be supplied to the storage room 21 through a discharge port 62b. In the discharge port 62b, a cool air guide device 70 for controlling opening and closing of the discharge port 62b may be provided to adjust a heading direction of cool air discharged through the discharge port 62b.

A part of the cool air may be supplied to the inside of the storage room 21 through the cool air flow paths 61a and 62a of the guide cover 60, and the remaining part of the cool air may be supplied to the temperature controlled room 100.

The cool air supplier 80 may supply cool air to a rear area of the temperature controlled room 100 to maintain or decrease an inside temperature of the temperature controlled room 100.

According to an embodiment of the disclosure, the cool air supplier 80 may include the fans 80a and 80b facing the evaporator 3. The fans 80a and 80b may supply cool air generated by the evaporator 3 to the inside of the temperature controlled room 100 through a cool air supply flow path 84a. However, the cool air supplier 80 may not face the evaporator 3. For example, the refrigerator 1 may include a single evaporator, which is not shown in the drawings. In this case, the evaporator may be positioned in the freezing room, and the refrigerator 1 may include a duct for guiding cool air generated by the evaporator to the refrigerating room, and a first fan for causing cool air of the duct to flow. The cool air supplier 80 may cover a part of the duct. The cool air supplier 80 may include a second fan for supplying cool air of the duct to the temperature controlled room 100. In this case, in inside of the duct, covered by the cool air supplier 80, no evaporator may be positioned. Accordingly, the cool air supplier 80 may not face the evaporator. According to an embodiment of the disclosure, the cool air supplier 80 may be any configuration positioned on a cool air flow path to supply cool air to the temperature controlled room 100.

Figure 3:
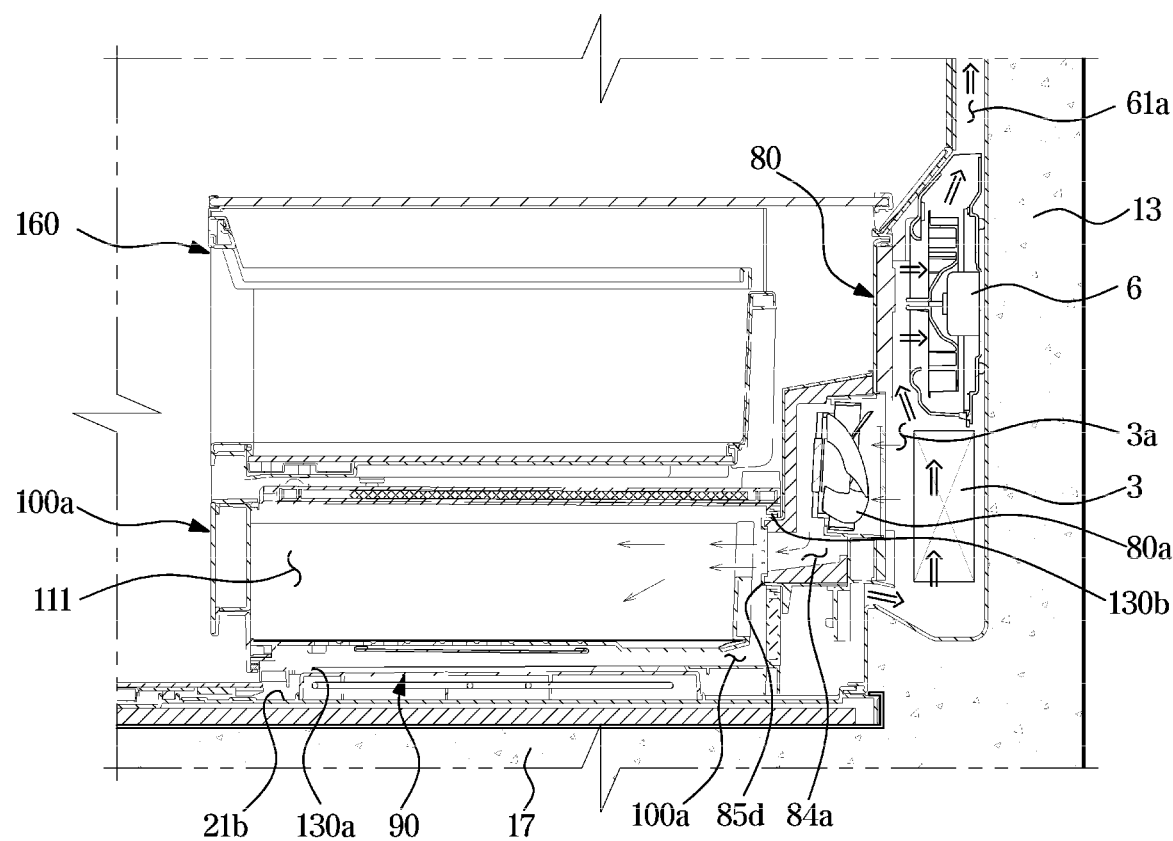
FIG. 3 shows the flow of cool air moving to a temperature controlled room, in the refrigerator shown in FIG. 2.

FIG. 3 shows the flow of cool air moving to a temperature controlled room, in the refrigerator shown in FIG. 2.

Referring to FIG. 3, the cool air supplier 80 may directly supply cool air generated by the evaporator 3 to the temperature controlled room 100. The meaning of "directly supplying cool air" may be that cool air is supplied directly to the temperature controlled room 100 without passing through the storage room 21.

A part of cool air generated by the evaporator 3 may move to the cool air flow path 61a and 62a by the ventilation fan 6, and the remaining part of the cool air may move to the first temperature controlled room 100a by the first fan 80a or to the second temperature controlled room 100b by the second fan 80b.

In the drawing, the first fan 80a and the first temperature controlled room 100a are shown, however, the same moving path of cool air may also be applied to the second fan 80b and the second temperature controlled room 100b, and therefore, a detailed description thereof will be omitted.

Upon operating of the first fan 80a, a part of cool air of the cooling chamber 3a may be supplied to the first temperature controlled room 100a via the cool air supply flow path 84a. A case hole 130b may be formed in a rear side of the case 130 to supply cool air to the first temperature controlled room 100a. The case hole 130b may be connected to the other end of the cool air supply flow path 84a. More specifically, a protrusion 85d of a cover member 85 may be inserted in the case hole 130b. By this structure, cool air may be supplied directly from the cooling chamber 3a to the temperature controlled room 100 via the cool air supply flow path 84a of the cool air supplier 80, without passing through the storage room 21.

As described above, although not shown in the drawing, the evaporator 3 may be not positioned in a rear area of the cool air supplier 80. In this case, the cool air supplier 80 may be positioned in the middle of the cool air flow path through which cool air generated by the evaporator 3 is supplied to the temperature controlled room 100. The fans 80*a* and 80*b* of the cool air supplier 80 may operate to supply cool air passing through the cool air flow path directly to the temperature controlled room 100.

Figure 4:
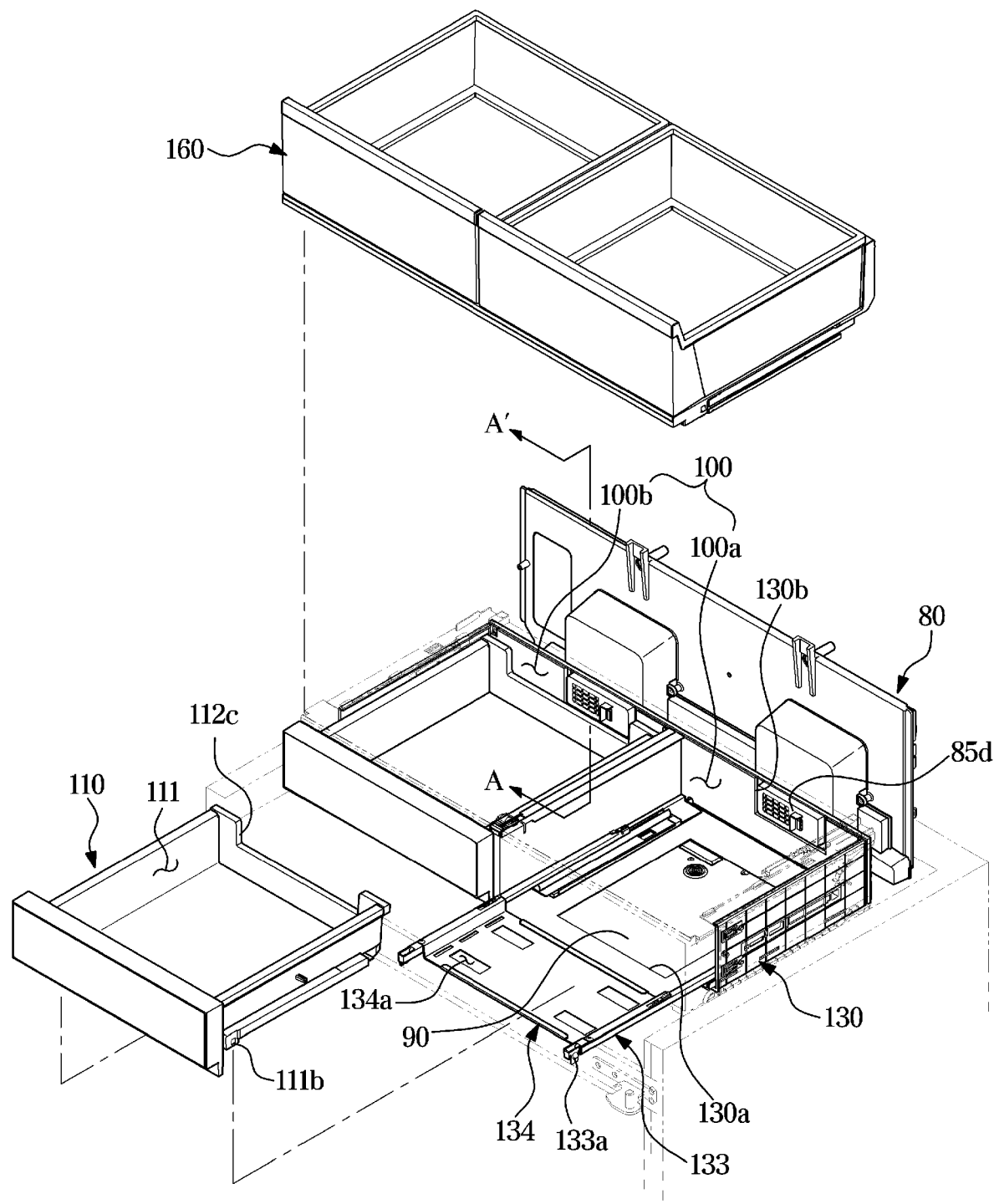
FIG. 4 shows a coupling relationship between a cool air supplier and a case, in a refrigerator according to an embodiment of the disclosure.

FIG. 4 shows a coupling relationship between a cool air supplier and a case, in a refrigerator according to an embodiment of the disclosure.

Referring to FIG. 4, the cool air supplier 80 may be positioned behind the case 130. According to an embodiment of the disclosure, the cool air supplier 80 may cover a portion of a rear surface of the storage room 21, and more specifically, the cool air supplier 80 may cover a lower area of the rear surface of the storage room 21.

In the cool air supplier 80, the cover member 85 may protrude more than a first body 81 and a second body 82 which will be described later, to prevent cool air from staying in the cooling chamber 3*a* by reducing a size of the cooling chamber 3*a*. The fans 80*a* and 80*b* may be installed inside the cover member 85, and an insulating member 84 including the cool air supply flow path 84*a* may be positioned between the fans 80*a* and 80*b* and the cover member 85.

As shown in FIG. 4, the cool air supplier 80 may be coupled with the case 130 by inserting the protrusion 85*d* of the cover member 85 into the case hole 130*b*. As a result of inserting the protrusion 85*d* into the case hole 130*b*, the other end of the cool air supply flow path 84*a* may be positioned in the inside of the case 130. In other words, the other end of the cool air supply path 84*a* may be connected to the inside of the temperature controlled room 100.

The drawer 110 may be accommodated in the temperature controlled room 100 to locate the storage space 111 of the drawer 110 in the temperature controlled room 100. Cool air supplied to the temperature controlled room 100 may also be supplied to the storage space 111. To smoothly supply cool air to the storage space 111, the drawer 110 may include a hollow portion 112*c* formed at the rear side. Cool air entered the temperature controlled room 100 through the case hole 130*b* via the hollow portion 112*c* may be easily supplied to the storage space 111. However, the hollow portion 112*c* of the drawer 110 may be omitted according to a design specification.

According to an embodiment of the disclosure, the drawer 110 may be withdrawn and separated from the case 130. To prevent the drawer 110 from being separated from the case 130 against a user's intention, a pair of coupling holes 111*b* may be formed in the drawer 110, and a pair of elastic protrusions 133*a* may be formed at front ends of a pair of rails 133 of the case 130 to be inserted in the coupling holes 111*b*. A user may press the pair of elastic protrusions 133*a* to move the elastic protrusions 133*a* to inner portions of the coupling holes 111*b*, and then separate the drawer 110 from the rails 133. The drawer 110 may be separated from the rails 133 to thereby be separated from the case 130.

According to an embodiment of the disclosure, a rail connecting portion 134 connecting the pair of rails 133 to each other and positioned below the drawer 110 may be provided.

The rail connecting portion 134 may be made of a metal material having high thermal conductivity. For example, the rail connecting portion 134 may be made of aluminum. The rail connecting portion 134 may connect the pair of rails 133 separated from each other such that the pair of rails 133 are together put in or withdrawn from the case 130. Also, the rail connecting portion 134 may connect the pair of rails 133 to each other to reinforce strength. Also, the rail connecting portion 134 may be made of a material having high thermal conductivity to receive hot air from the heating portions 90 and transfer the hot air to the drawer 110.

In a bottom of the case 130, a heater hole 130*a* may be formed to correspond to a heater cover 91 protruding upward from a bottom 21*b* of the storage room 21. The heater hole 130*a* may correspond to the heater cover 91. As a result of an arrangement of each heating portion 90 corresponding to the heater hole 130*a*, the heating portion 90 may substantially form a part of the bottom of the case 130. Accordingly, a similar effect to direct heating of the bottom of the case 130 may be obtained. Therefore, inside air of the case 130 may be directly heated by the heating portion 90. Also, the temperature controlled room 100 may be quickly heated. As a result of quick heating of the temperature controlled room 100, the storage space 111 of the drawer 110 may also be quickly heated.

The rail connecting portion 134 may be positioned on the heater cover 91, and the drawer 110 may be positioned on the rail connecting portion 134. The heater cover 91 may be spaced a preset distance from the rail connecting portion 134 to prevent friction and noise.

Inside air of the temperature controlled room 100, heated by the heating portion 90, may be transferred to the storage space 111 of the drawer 110 via the rail connecting portion 134. A plurality of holes 134*a* may be formed in the rail connecting portion 134, and the heated inside air of the temperature controlled room 100 may directly move to the storage space 111 of the drawer 110 through the holes 134*a*. Although not shown in the drawing, a single hole 134*a* may be formed at a center of the rail connecting portion 134. Also, the rail connecting portion 134 may include no hole.

According to an embodiment of the disclosure, as shown in FIG. 4, the rail connecting portion 134 may be in a shape of a plate having a smaller size than the heater hole 130*a*. However, a size and shape of the rail connecting portion 134 are not limited. The rail connecting portion 134 may be in a shape of a plate, and the size of the rail connecting portion 134 may be equal to or larger than that of the heater hole 130*a*. Also, the rail connecting portion 134 may be in a shape of a bar and connect the pair of rails 133.

In the rear side of the case 130, the case hole 130*b* in which the cover member 85 of the cool air supplier 80 is inserted may be formed. Cool air may be supplied to the inside of the case 130 through the case hole 130*b*. As a result of insertion of the drawer 110 into the inside of the case 130, the open front side of the case 130 may be covered by the drawer 110, and accordingly, the inside of the case 130 may be sealed. Accordingly, inside temperature of the drawer 110 may become the same as that of the temperature controlled room 100. Therefore, a temperature sensor 83*b* may sense inside temperature of the temperature controlled room 100, instead of sensing inside temperature of the drawer 110.

Figure 5:
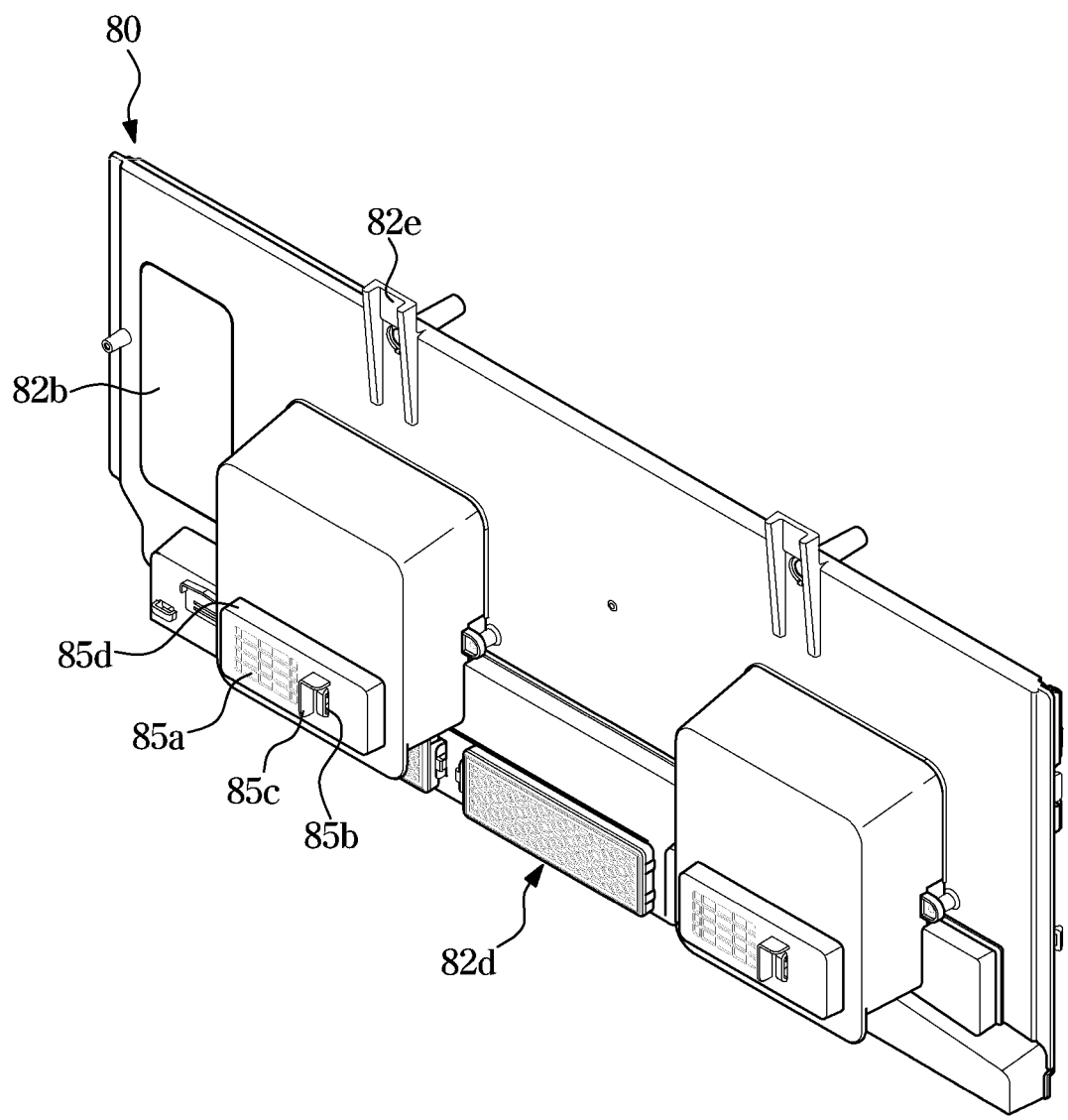
FIG. 5 shows a cool air supplier in a refrigerator according to an embodiment of the disclosure.
Figure 6:
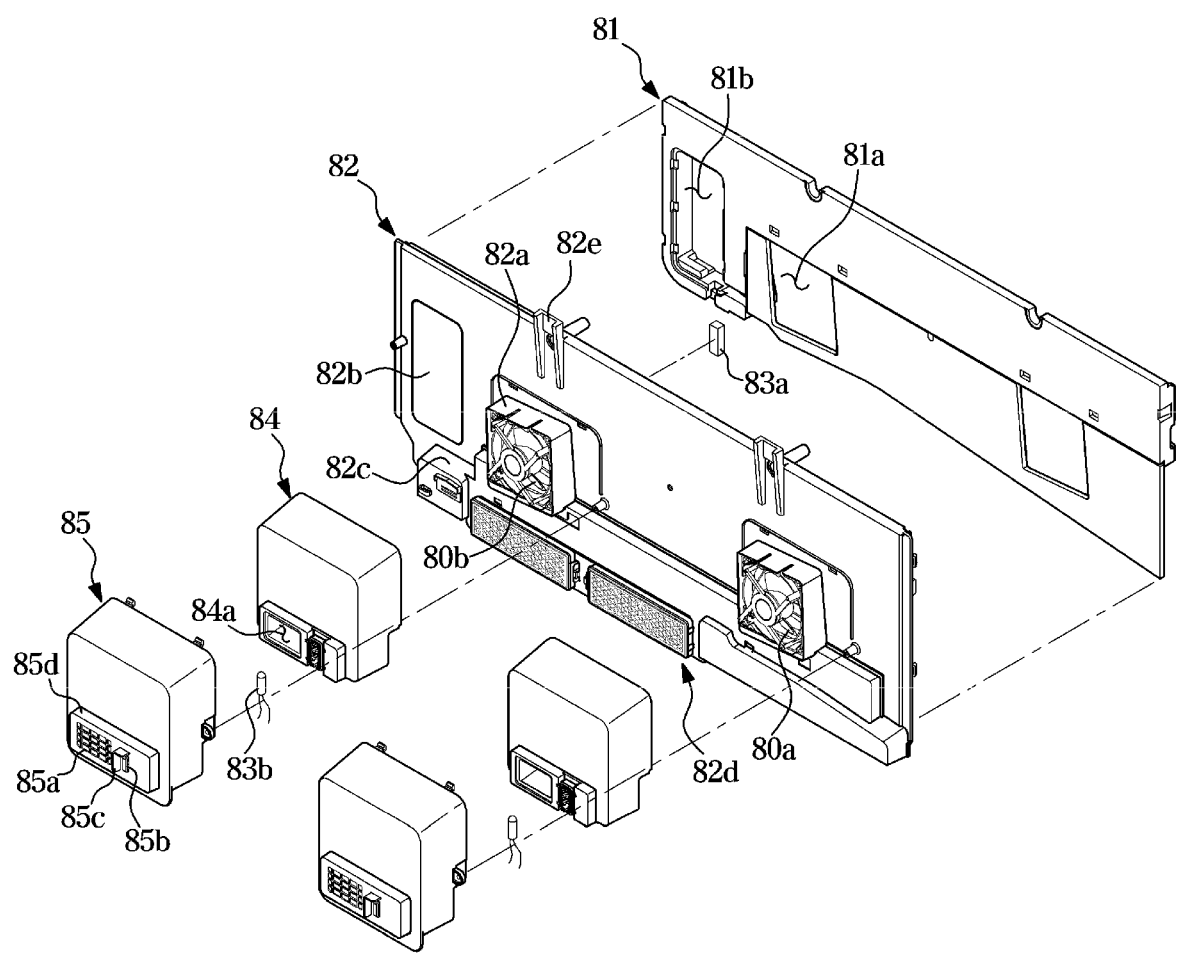
FIG. 6 is an exploded view of the cool air supplier shown in FIG. 5.

FIG. 5 shows a cool air supplier in a refrigerator according to an embodiment of the disclosure. FIG. 6 is an exploded view of the cool air supplier shown in FIG. 5.

Hereinafter, the cool air supplier 80 according to an embodiment of the disclosure will be described in detail with reference to FIGS. 5 and 6.

The cool air supplier 80 may be positioned in front of the cool air flow paths 61*a* and 62*a*. The cool air supplier 80 may be positioned in front of the cool air flow paths 61*a* and 62*a* to supply cool air on the cool air flow paths 61*a* and 62*a* to the temperature controlled room 100.

According to an embodiment of the disclosure, the cool air supplier 80 may be positioned in front of the evaporator 3. The cool air supplier 80 may be positioned in front of the evaporator 3 to form the cooling chamber 3a in which the evaporator 3 is accommodated.

The cool air supplier 80 may include the fans 80a and 80b facing the evaporator 3. According to an embodiment of the disclosure, because the temperature controlled room 100 includes the first temperature controlled room 100a and the second temperature controlled room 100b, the cool air supplier 80 may include the first fan 80a for supplying cool air to the first temperature controlled room 100a and the second fan 80b for supplying cool air to the second temperature controlled room 100b. The number of the fans 80a and 80b may correspond to the number of the temperature controlled room 100.

The cool air supplier 80 may form a part of the cool air flow paths 61a and 61b. The cool air supplier 80 may include a first body 81 forming a part of the cool air flow paths 61a and 61b, wherein cool air ports 81a are formed in the first body 81, a second body 82 coupled with a front side of the first body 81 to install the fans 80a and 80b at locations corresponding to the cool air ports 81a, and a cover member 85 coupled with the second body 82 to accommodate the fans 80a and 80b therein. Also, the cool air supplier 80 may include an insulation member 84 installed inside the cover member 85. The insulation member 84 may fill a space between the cover member 85 and the fans 80a and 80b, and prevent cool air of the cool air flow paths 61a and 62a from leaking out of the cool air supplier 80 while the cool air is guided to the temperature controlled room 100. Also, the insulation member 84 may form a cool air supply flow path 84a through which cool air of the cool air flow paths 61a and 62a is guided to the temperature controlled room 100. In the present specification, a plate portion may indicate the first body 81 and the second body 82.

Also, the cool air supplier 80 may include a humidity sensor 83a for sensing inside humidity of the temperature controlled room 100, and a temperature sensor 83b for sensing inside temperature of the temperature controlled room 100.

The first body 81 may include the cool air ports 81a corresponding to the number and locations of the fans 80a and 80b. According to an embodiment of the disclosure, a pair of cool air ports 81a may be provided. The first body 81 may further include a connector accommodating portion 81b at one side. A plurality of connectors (not shown) may be accommodated in the connector accommodating portion 81b, and the plurality of connectors may be respectively connected to wires (not shown).

The second body 82 may include fan accommodating portions 82a for accommodating the fans 80a and 80b. The fan accommodating portions 82a may have inside spaces for accommodating the first and second fans 80a and 80b. The fan accommodating portions 82a may protrude in the front direction from the first body 82. However, each fan accommodating portion 82a may be formed on an inner surface of the cover member 85, or provided as a separate configuration and coupled with the second body 82 or the inner surface of the cover member 85.

Referring to FIG. 5, a bottom of each fan accommodating portion 82a may be inclined with respect to the bottom 21b of the storage room 21. The cool air port 81a may have a shape corresponding to the fan accommodating portion 82a. Accordingly, the cool air port 81a may be substantially in a shape of a square, and inclined with respect to the bottom 21b of the storage room 21.

Inclining the bottom of the fan accommodating portion 82a with respect to the bottom 21b of the storage room 21 may be aimed to cause a liquid unexpectedly entered from above of the cool air supplier 80 to flow down. By inclining the bottom and top of the fan accommodating portion 82a aligned in parallel, a liquid entered the top of the fan accommodating portion 82a may naturally flow down by the inclination to be prevented from entering the fans 80a and 80b. Because a liquid entered the fans 80a and 80b may cause a wrong operation of the fans 80a and 80b, the inclined arrangement of the fan accommodating portions 82a may prevent a liquid from entering insides of the fans 80a and 80b.

The second body 82 may include a connector cover 82b covering the front side of the connector accommodating portion 81b. Because a user accesses the cool air supplier 80 in front of the storage room 21, the user may access the plurality of connectors (not shown) by opening the connector cover 82b or separating the connector cover 82b from the second body 82.

The second body 82 may include a humidity sensor installing portion 82c on which the humidity sensor 83a is installed. The humidity sensor installing portion 82c may protrude in the front direction from the second body 82. The humidity sensor 83a may be installed on an inner side of the humidity sensor installing portion 82c. The inner side of the humidity sensor installing portion 82c may indicate a rear surface of the second body 82 on which the humidity sensor installing portion 82c is positioned.

The humidity sensor 83a may sense inside humidity of the storage room 21. The humidity sensor 83a may be positioned outside the drawer 110 to sense inside humidity of the storage room 21. Therefore, the humidity sensor 83a may not correspond to the number of the drawer 110. That is, a single humidity sensor 83a may be provided.

The second body 82 may cover an inlet (not shown) through which air enters the cooling chamber 3a, and include an inlet cover 82d in which a deodorizer or a filter is installed. The deodorizer or the filter may be installed in a space formed between the inlet (not shown) and the inlet cover 82d. After the inlet cover 82d is separated from the second body 82, the deodorizer or the filter may be installed or separated.

The second body 82 may include a support portion 82e coupled with the discharge cover 61 to support the discharge cover 61. The support portion 82e may couple the cool air supplier 80 with the discharge cover 61. The second body 82 may be stably coupled with the discharge cover 61 by the support portion 82e, and the discharge cover 61 may be supported by the second body 82.

The insulation member 84 may cover the fans 80a and 80b. Also, the insulation member 84 may form the cool air supply flow path 84a for guiding cool air. One end of the cool air supply flow path 84a may be connected to the fans 80a and 80b, and the other end of the cool air supply flow path 84a may be connected to the case 130. The insulation member 84 may be made of various materials, for example, a urethane foam or a Styrofoam material.

The temperature sensor 83b may be installed at one side of a front surface of the insulation member 84. Because the temperature sensor 83b is a configuration for sensing inside temperature of the temperature controlled room 100, the number of the temperature sensor 83b may correspond to the number of the temperature controlled room 100.

The cover member 85 may accommodate the insulation member 84 and the fans 80a and 80b covered by the insulation member 84. In other words, the insulation member 84 may fill a space formed between the cover member 85 and the fans 80a and 80b. The cover member 85 may include a grille portion 85a covering the other end of the cool air supply flow path 84a connected to the temperature controlled room 100. However, the grille portion 85a may be in a shape of a hole, without having a grille, despite its name. That is, the grille portion 85a may be in a shape of an opening forming the other end of the cool air supply flow path 84a, although not shown in the drawing. Also, the cover member 85 may include an opening 85b corresponding to a location of the temperature sensor 83b such that air enters or exits the temperature sensor 83b. Also, the cover member 85 may include a guide rib 85c to prevent cool air discharged through the grille portion 85a from directly entering the opening 85b. Also, the cover member 85 may include a protrusion 85d inserted in the case hole 130b to connect the other end of the cool air supply flow path 84a to the temperature controlled room 100.

According to an embodiment of the disclosure, the cool air supplier 80 may be provided to quickly supply cool air to the temperature controlled room 100. Because the cool air supplier 80 according to an embodiment of the disclosure includes the first fan 80a for supplying cool air to the first temperature controlled room 100a and the second fan 80b for supplying cool air to the second temperature controlled room 100b, the cool air supplier 80 may quickly supply cool air to the first temperature controlled room 100a and the second temperature controlled room 100b. Also, because another ventilation fan 6 for supplying cool air to the storage room 21 is provided in addition to the first fan 80a and the second fan 80b, supplying cool air to the storage room 21 may be not influenced by supplying cool air to the temperature controlled room 100.

Figure 7:
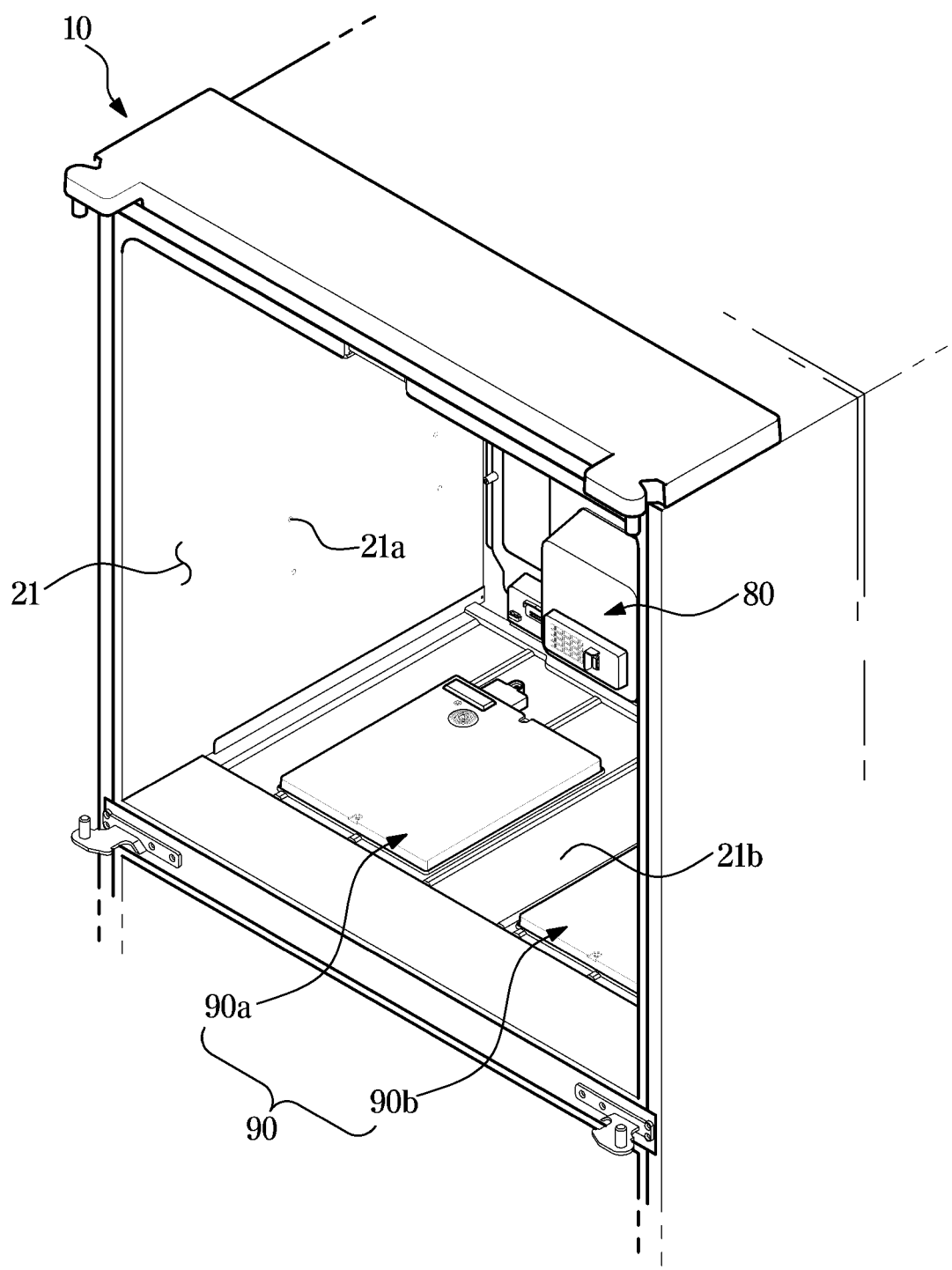
FIG. 7 shows a heater installed in a storage room in a refrigerator according to an embodiment of the disclosure.
Figure 8:
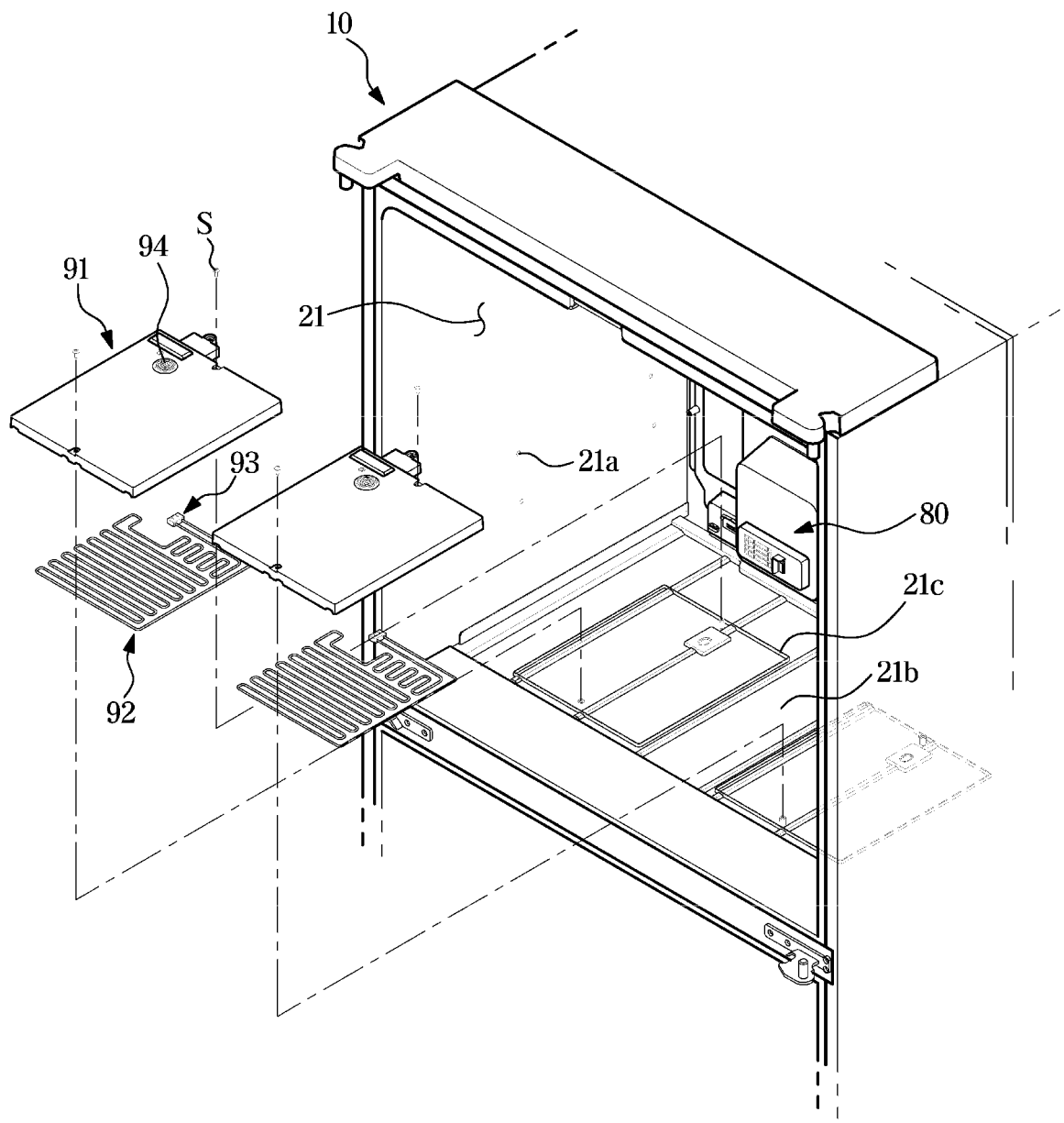
FIG. 8 is an exploded view of the heater in the refrigerator shown in FIG. 7.

FIG. 7 shows a heater installed in a storage room in a refrigerator according to an embodiment of the disclosure. FIG. 8 is an exploded view of the heater in the refrigerator shown in FIG. 7.

Hereinafter, the heater according to an embodiment of the disclosure will be described in detail with reference to FIGS. 7 and 8.

According to an embodiment of the disclosure, the refrigerator 1 may include the heating portion 90 for heating inside air of the temperature controlled room 100. The heating portion 90 may be positioned on the bottom 21b of the storage room 21. The heating portion 90 may include a first heating portion 90a positioned on a bottom of the first temperature controlled room 100a, and a second heating portion 90b positioned on a bottom of the second temperature controlled room 100b.

Referring to FIG. 8, the heating portion 90 may include a heater cover 91 coupled with the bottom 21b of the storage room 21, a heater 92 positioned on an inner, upper surface of the heater cover 91, a connector 93 for supplying current to the heater 92, and a bimetal installing portion 94 in which a bimetal (not shown) for preventing overheating of the heater 92 is installed.

The heater cover 91 may be coupled with the bottom 21b of the storage room 21. An area of the bottom 21b of the storage room 21, with which the heater cover 91 is coupled, may protrude upward. The heater cover 91 may be in a shape of a parallelepiped of which a lower side opens. On the bottom 21b of the storage room 21, a rib 21c may be formed to correspond to side surfaces of the heater cover 91. The rib 21c may protrude upward from the bottom 21b. The heater cover 91 may be inserted in inside of the rib 21c.

Because the rib 21c protrudes upward from the bottom 21b to be at a preset height from the bottom 21b, a liquid flowing along an outer side of the rib 21c may be prevented from entering the inside of the rib 21c. An upper side of the rib 21c may open. However, the open upper side of the rib 21c may be covered by coupling the heater cover 91 with the rib 21c. By the coupling structure of the rib 21c and the heater cover 91, water flowing on the heater cover 91 or the bottom 21b of the storage room 21 may be prevented from entering the inside of the heater cover 91.

In the drawings, an example in which the rib 21c protrudes upward from the bottom 21b of the storage room 21 is shown, although not limited thereto. However, an inside portion of the rib 21c may also protrude upward together, which is not shown in the drawings. In this case, the heater cover 91 may cover the rib 21c without being inserted in the inside of the rib 21c.

The heater 92 may be connected to ac current and heated, although not limited thereto. However, the heater 92 may be heated by dc current. The heater 92 may be coupled with the inner, upper surface of the heater cover 91. The reason may be that the heater 92 contacts the heater cover 91 to heat the heater cover 91. The heater 92 may contact the heater cover 91 to quickly heat the heater cover 91 through conduction. For example, the heater 92 may be attached to the inner, upper surface of the heater cover 91 by an aluminum tape (not shown).

The heater cover 91 may be removably coupled with the bottom 21b of the storage room 21. The heater cover 91 may be coupled with the bottom 21b of the storage room 21 by various methods. For example, the heater cover 91 may be coupled with the bottom 21b of the storage room 21 by using a screw S. However, the heater cover 91 may be inserted in the rib 21c.

The bimetal may be installed in the bimetal installing portion 94, which is not shown. The bimetal (not shown) may be provided to prevent overheating of the heater 92.

The heating portion 90 may be positioned outside the temperature controlled room 100. Also, the heating portion 90 may be positioned below the temperature controlled room 100. The heating portion 90 may be positioned on the bottom 21b of the storage room 21. The heating portion 90 may not contact the temperature controlled room 100. Also, the heating portion 90 may be spaced a preset distance from the drawer 110 to be not in contact with the drawer 110. Thereby, noise and abrasion that are generated by a friction between the drawer 110 and the heating portion 90 while the drawer 110 is put into or withdrawn from the case 130 may be prevented. The heating portion 90 may raise inside temperature of the temperature controlled room 100 through convection or radiation.

According to an embodiment of the disclosure, because no component for cooling or heating is provided inside the case 130, utilization of inside space of the case 130 may be improved. In other words, because no component for cooling or heating is provided in the temperature controlled room 100, utilization of space of the temperature controlled room 100 may be improved. Also, the case 130 may be freely separated from the storage room 21. Also, the drawer 110 accommodated in the case 130 may be freely separated from the case 130.

According to an embodiment of the disclosure, because the temperature controlled room 100 includes no configuration having a direct relationship with cooling or heating, the case 130 forming the temperature controlled room 100 may be freely separated from the storage room 21. For example, because a configuration for supplying cool air to the temperature controlled room 100 or a configuration for heating the temperature controlled room 100 is not positioned inside the case 130, a configuration such as a wire connected from the outside of the case 130 to the inside of the case 130 may be not provided. Accordingly, the case 130 may be separated from the storage room 21 and withdrawn to the outside of the storage room 21. Also, the drawer 110 accommodated inside the case 130 in such a way to be withdrawable from the case 130 may be easily separated from the case 130, like general storage containers. Also, because no electronics are provided inside the drawer 110, the case 130 and the drawer 110 may be separated from the storage room 21 and then washed with water.

Figure 9:
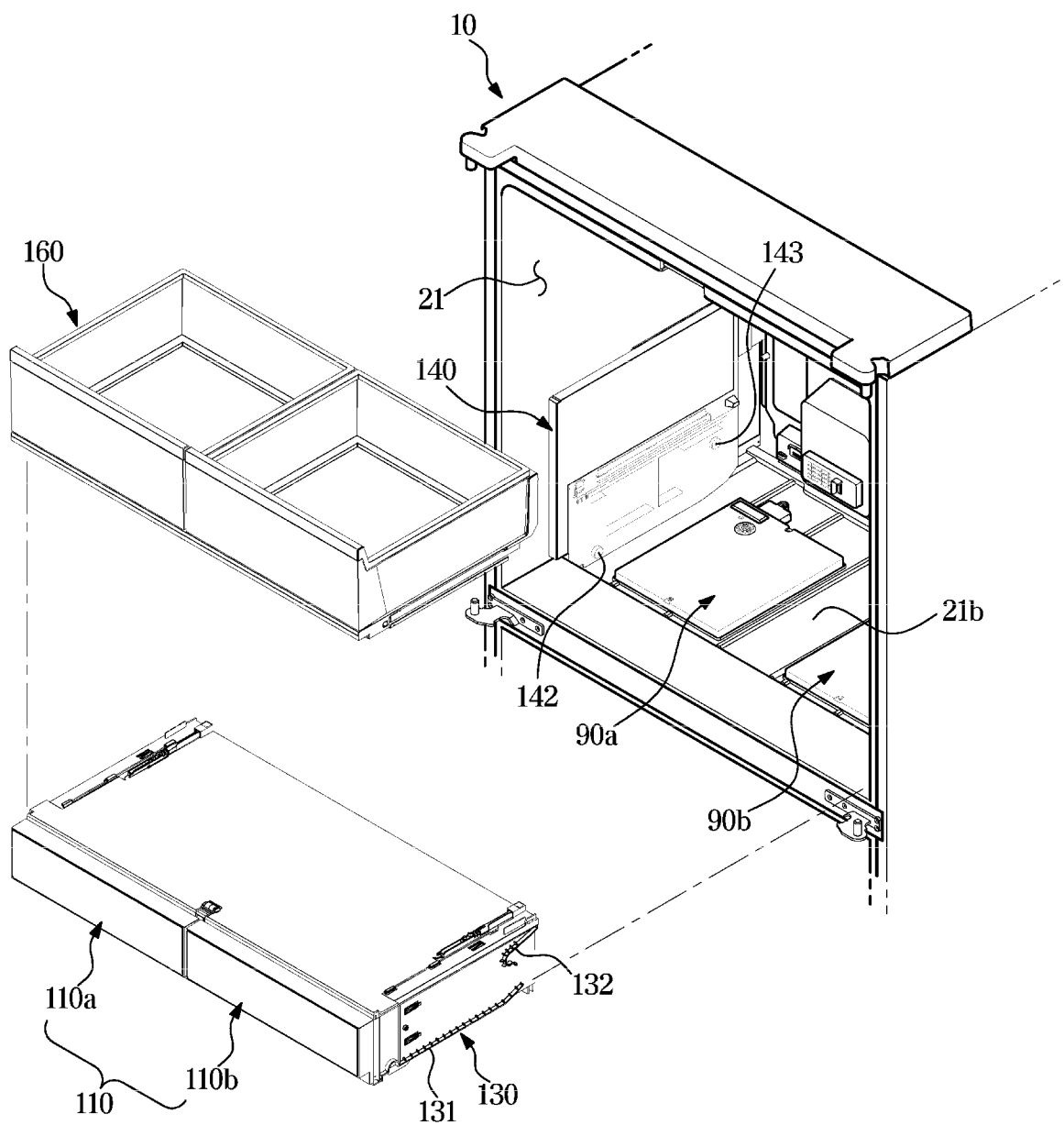
FIG. 9 shows a state in which a drawer, a case, and a storage container are withdrawn from a storage room, in a refrigerator according to an embodiment of the disclosure.
Figure 10:
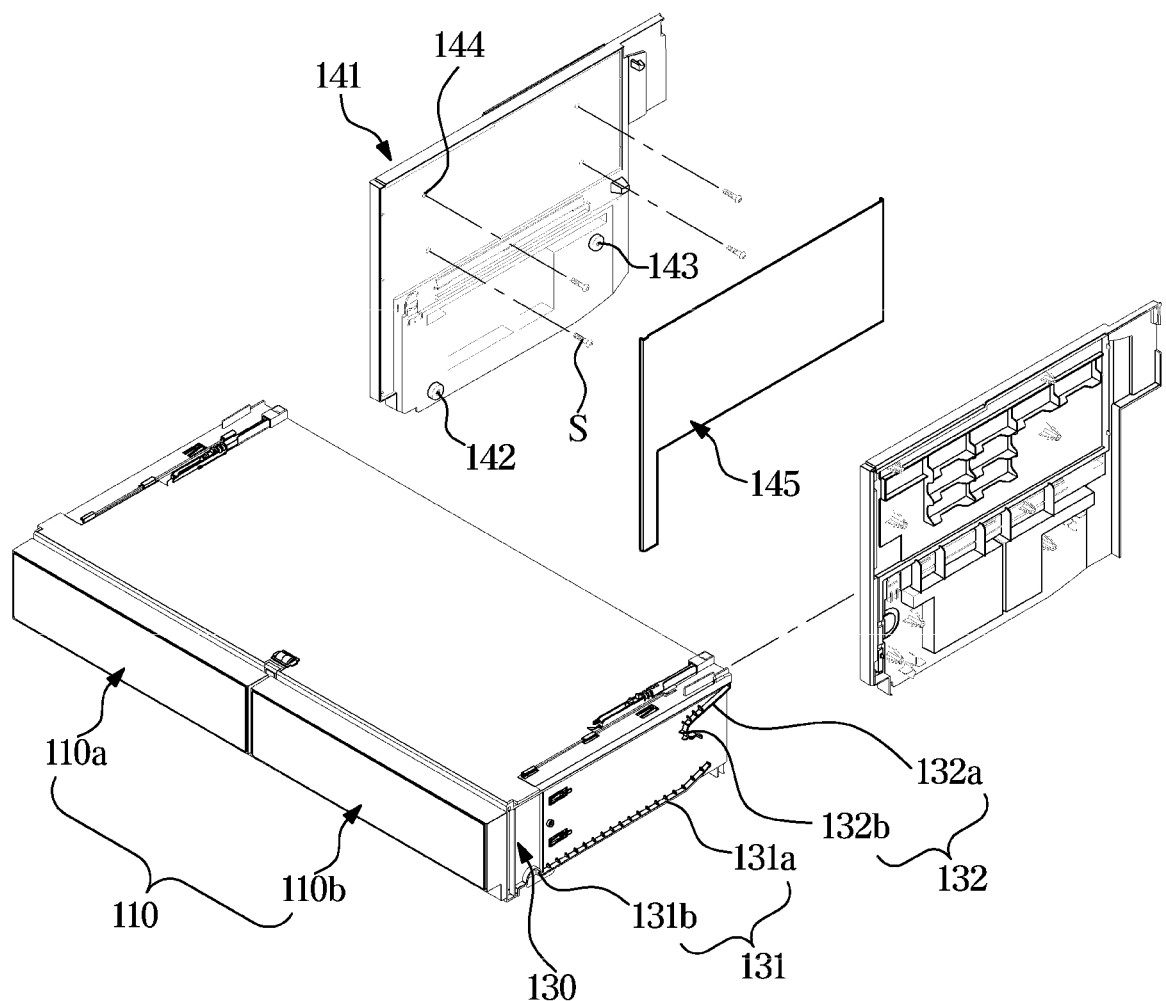
FIG. 10 shows a case and a side cover in a refrigerator according to an embodiment of the disclosure.

FIG. 9 shows a state in which a drawer, a case, and a storage container are withdrawn from a storage room, in a refrigerator according to an embodiment of the disclosure. FIG. 10 shows a case and a side cover in a refrigerator according to an embodiment of the disclosure.

According to an embodiment of the disclosure, the drawer 110, the case 130, and the storage container 160 positioned on the case 130 may be separated from the storage room 21.

A pair of side covers 140 may be provided on both side surfaces of the storage room 21. The side covers 140 may be coupled with the side surfaces of the storage room 21, which will be described later. For example, the side covers 140 may be coupled with the storage room 21 through screw fastening using a screw driver.

The drawer 110, the case 130, and the storage container 160 may be separated from the storage room 21. The drawer 110 may be withdrawn from the case 130, and also separated from the case 130. The case 130 may be separated from the storage room 21, and coupled with the storage room 21. The case 130 may include coupling ribs 131 and 132 at each side surface. The coupling ribs 131 and 132 may protrude outward from each side surface of the case 130. Each side cover 140 may include coupling protrusions 142 and 143 that are coupled with the coupling ribs 131 and 132.

The side cover 140 may include the coupling protrusions 142 and 143 protruding from the side covers 140. The coupling protrusions 142 and 143 may include a first coupling protrusion 142 and a second coupling protrusion 143. The first coupling protrusion 142 may be positioned at a front, lower portion of the side cover 140, and the second coupling protrusion 143 may be positioned at a rear, upper portion of the side cover 140. The first coupling protrusion 142 and the second coupling protrusion 143 may be substantially in a shape of a cylinder. Also, the first coupling protrusion 142 and the second coupling protrusion 143 may be made of an elastically deformable material, for example, a rubber material. The reason may be to soften an impact upon coupling with the case 130.

The case 130 may include the coupling ribs 131 and 132. The coupling ribs 131 and 132 may include a first coupling rib 131 which guides the first coupling protrusion 142 and in which the first coupling protrusion 142 is installed, and a second coupling rib 132 which guides the second coupling protrusion 143 and in which the second coupling protrusion 143 is installed.

The first coupling rib 131 may include a first protrusion guide 131a for guiding the first coupling protrusion 142 upon installation of the case 130 in the storage room 21. The first protrusion guide 131a may extend substantially horizontally from a front portion of the case 130 to a rear portion of the case 130, and a rear end of the first protrusion guide 131a may be inclined upward.

The first coupling rib 131 may include a first protrusion coupling portion 131b in which the first coupling protrusion 142 is installed upon installation of the case 130 in the storage room 21. The first protrusion coupling portion 131b may have a shape corresponding to the first coupling protrusion 142, and include a groove in which the first coupling protrusion 142 is inserted. The first protrusion coupling portion 131b may be positioned in a front end of the first protrusion guide 131a. The first protrusion coupling portion 131b may be positioned in a front, lower portion of the case 130.

The second coupling rib 132 may include a second protrusion guide 132a for guiding the second coupling protrusion 143 upon installation of the case 130 in the storage room 21. The second protrusion guide 132a may extend toward the front portion of the case 130 from the rear portion of the case 130 in such a way to be inclined downward. The second protrusion guide 132a may have a shorter length than the first protrusion guide 131a.

The second coupling rib 132 may include a second protrusion coupling portion 132b in which the second coupling protrusion 143 is installed upon installation of the case 130 in the storage room 21. The second protrusion coupling portion 132b may have a shape corresponding to the second coupling protrusion 143, and include a groove in which the second coupling protrusion 143 is inserted. The second protrusion coupling portion 132b may be positioned in a front end of the second protrusion guide 132a. The second protrusion coupling portion 132b may be positioned in a rear, upper portion of the case 130.

Referring to FIG. 10, the side cover 140 may be separated from or coupled with a side surface of the storage room 21.

The side cover 140 may include a coupling member 141 coupled with the side surface of the storage room 21, and a cover 145 covering a portion of the coupling member 141.

The coupling member 141 may include the first coupling protrusion 142 and the second coupling protrusion 143. Also, the coupling member 141 may include a coupling portion 144 corresponding to a coupling hole 21a (see FIG. 8) formed in the side surface of the storage room 21. A plurality of coupling holes 21a and a plurality of coupling portions 144 may be provided for stable coupling. The coupling portion 144 may be coupled with the coupling hole 21a by various coupling methods. For example, the coupling portion 144 may be coupled with the coupling hole 21a by a screw S and a screw driver (not shown).

The cover 145 may cover the coupling portion 144 of the coupling member 141 to improve aesthetic impression. The cover 145 may be made of a material that gives a sense of unity with the side surface of the storage room 21, and the cover 145 may be in a shape of a plate. The cover 145 may prevent the coupling portion 144 from being exposed to a user, thereby improving aesthetic impression.

Although not shown in the drawings, the first coupling protrusion 142 and the second coupling protrusion 143 may be coupled with the side surface of the storage room 21 or formed together with the side surface of the storage room 21. According to this structure, the first coupling protrusion 142 and the second coupling protrusion 143 may be provided on the side surface of the storage room 21 without any side cover.

Figure 11:
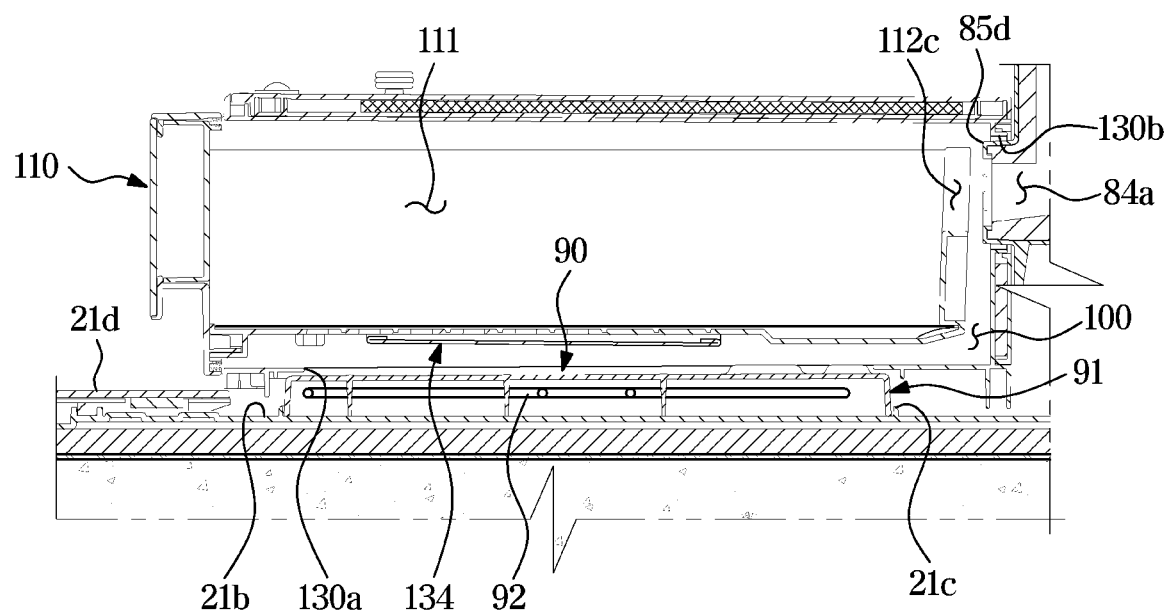
FIG. 11 is a cross-sectional view taken along line A-A' of FIG. 4.

FIG. 11 is a cross-sectional view taken along line A-A' of FIG. 4.

Referring to FIG. 11, the heating portion 90 may be positioned outside the temperature controlled room 100. More specifically, the heating portion 90 may be positioned below the temperature controlled room 100, and the heating portion 90 may be not in contact with the bottom of the case 130 forming the temperature controlled room 100. The heating portion 90 may correspond to a size of the heater hole 130a formed in the bottom of the case 130, without being in contact with the bottom of the case 130.

However, the heating portion 90 may correspond to the size of the heater hole 130a and be inserted in the heater hole 130a. In this case, the heating portion 90 may substantially form the bottom of the case 130 with respect to a portion of the case 130 in which the heater hole 130a is formed. That is, the heating portion 90 may fill the heater hole 130a to form a portion of the bottom of the case 130.

Because the heating portion 90 is inserted in the heater hole 130a or positioned adjacent to the heater hole 130a, the heating portion 90 may be positioned close to the inside of the temperature controlled room 100. Because the heating portion 90 is a configuration for heating inside air of the temperature controlled room 100, it may be advantageous to position the heating portion 90 close to inside air of the temperature controlled room 100. According to an embodiment of the disclosure, because the heater hole 130a is formed in the bottom of the case 130 and the heating portion 90 is inserted in the heater hole 130a or positioned adjacent to the heater hole 130a, the heating portion 90 may substantially form a portion of the bottom of the temperature controlled room 100. Accordingly, the heating portion 90 may directly heat air of the temperature controlled room 100.

Figure 12:
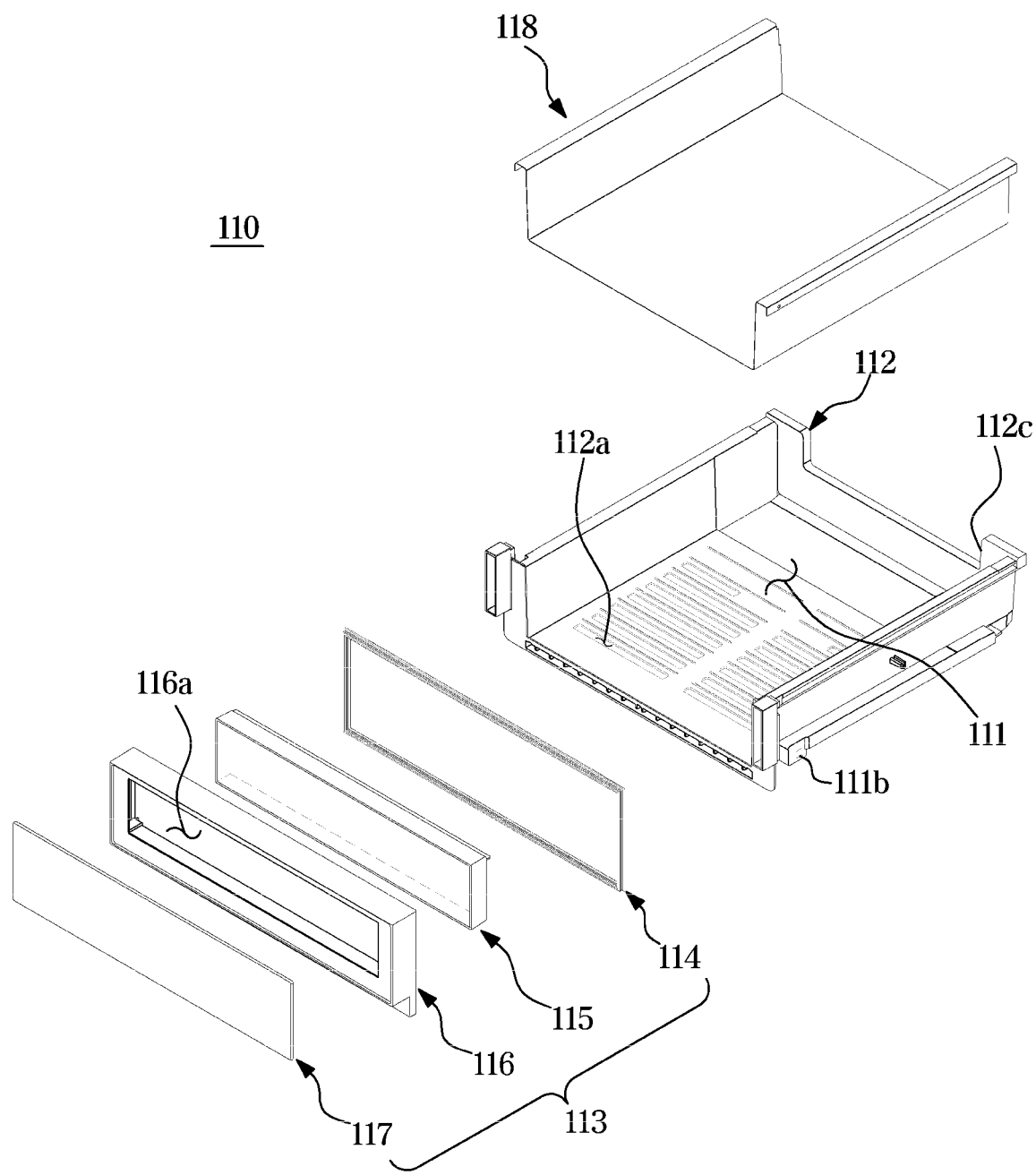
FIG. 12 is an exploded view of a drawer in a refrigerator according to an embodiment of the disclosure.

FIG. 12 is an exploded view of a drawer in a refrigerator according to an embodiment of the disclosure.

Referring to FIG. 12, the drawer 110 may include a body portion 112 having the storage space 111, wherein a plurality of holes 112a are formed in a bottom of the body portion 112, a cover portion 118 covering an inner surface of the body portion 112, and a cover 113 covering an open front side of the body portion 112. The body portion 112 may include the pair of coupling holes 111b. The pair of elastic protrusions 133a formed at the rails 133 may be inserted in the pair of coupling holes 111b.

The body portion 112 may include the plurality of holes 112a in the bottom to effectively transfer heat through convection or radiation. The body portion 112 may be an injection mold, although not limited thereto.

The cover portion 118 may be made of a metal material having high thermal conductivity, and cover the inner surface of the body portion 112. By manufacturing the body portion 112 as an injection mold and coupling the cover portion 118 with the body portion 112, instead of manufacturing the entire body portion 112 with a metal material, manufacturing cost may be reduced. Also, because forming a plurality of holes in an injection mold is easier than forming a plurality of holes in a metal material, productivity may be improved.

The cover 113 may cover the open front side of the body portion 112. The cover 113 may include a gasket 114 for sealing a gap between the cover 113 and the case 130, an insulation plate 115 that is transparent to show inside of the body portion 112 from a front side of the cover 113, a plate accommodating portion 116 accommodating the insulation plate 115 and including an opening 116a, and a glass 117 attached on a front surface of the plate accommodating portion 116.

The insulation plate 115 may be a transparent mold, and prevent inside hot air or cool air of the drawer 110 from leaking out.

The plate accommodating portion 116 may accommodate the insulation plate 115, and including the opening 116a that is smaller than the insulation plate 115. The glass 117 may be attached on the front surface of the plate accommodating portion 116. Because the glass 117 and the insulation plate 115 are transparent, a user may see the inside of the body portion 112 in front of the cover 113 through the glass 117, the opening 116a, and the insulation plate 115, although not limited thereto.

However, the cover 113 may include a metal plate, instead of the glass 117 and the insulation plate 115 made of a transparent material. Also, the cover 113 may be a single injection mold. In this case, the inside of the body portion 112 will be not shown in front of the cover 113.

Figure 13:
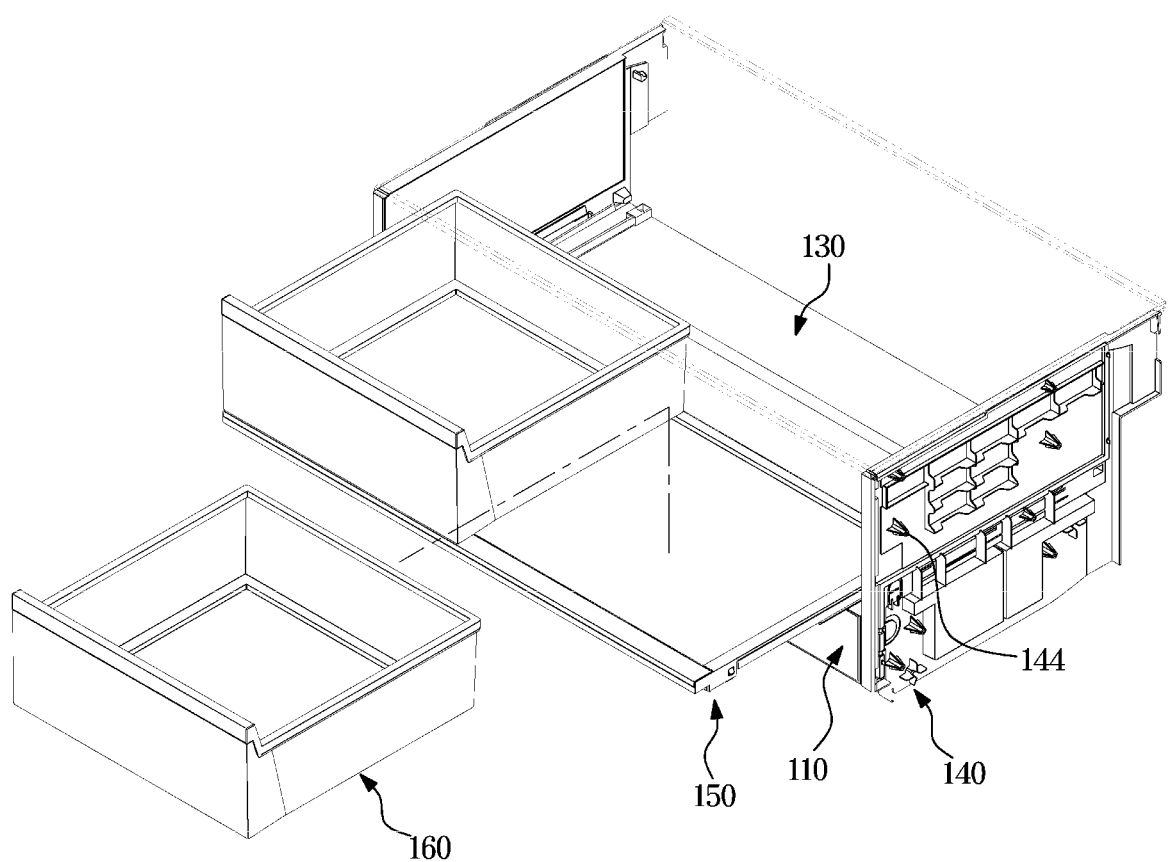
FIG. 13 shows a moving rack withdrawn from a case and a storage container separated from the moving rack, in a refrigerator according to an embodiment of the disclosure.

FIG. 13 shows a moving rack withdrawn from a case and a storage container separated from the moving rack, in a refrigerator according to an embodiment of the disclosure.

Referring to FIG. 13, a moving rack 150 may be provided in an upper space of the case 130. The moving rack 150 may move and be withdrawn in the front direction from the case 130.

On the moving rack 150, the storage container 160 may be placed. According to withdrawing of the moving rack 150, the storage container 160 may be withdrawn in the front direction from the case 130 together with the moving rack 150.

According to an embodiment of the disclosure, the storage container 160 may be movable in the left-right direction on the moving rack 150. FIG. 13 shows a pair of storage containers 160 having the same size, and in this case, it may be difficult to change an arrangement of the storage containers 160 through a left-right movement of the storage containers 160. However, in the case in which a plurality of storage containers 160 having various sizes are provided, the storage containers 160 may be separable from the moving rack 150 and movable in the left-right direction, which will be described later. In this case, the storage containers 160 may be arranged in various ways according to a user's preference.

Figure 14:
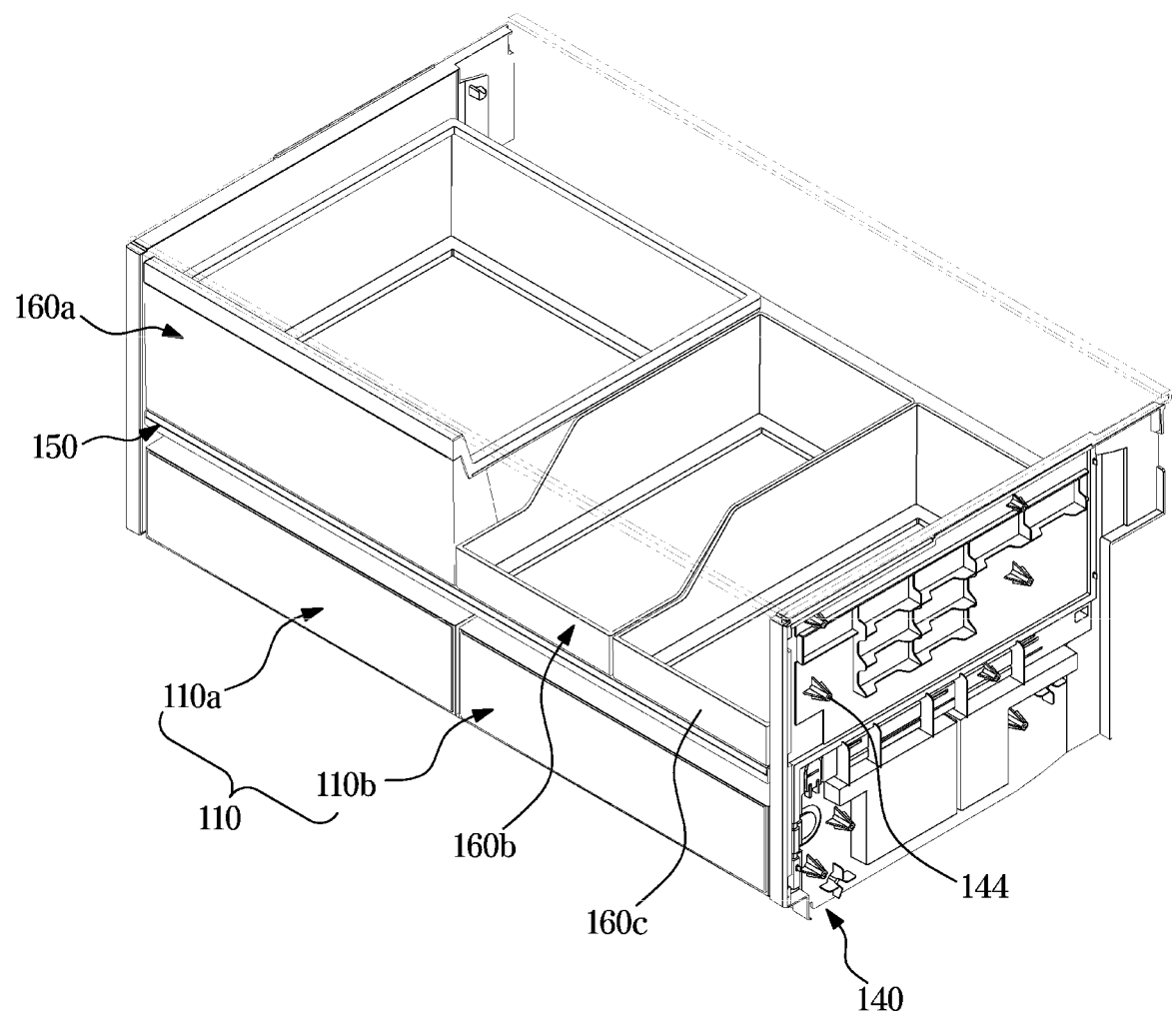
FIG. 14 shows different storage containers in the refrigerator shown in FIG. 13.

FIG. 14 shows different storage containers in the refrigerator shown in FIG. 13;

Referring to FIG. 14, according to an embodiment of the disclosure, a plurality of storage containers 160a, 160b, and 160c may include a first storage container 160a, a second storage container 160b, and a third storage container 160c.

The first storage container 160a may be larger than the second storage container 160b and the third storage container 160c. The second storage container 160b and the third storage container 160c may have the same size, although not limited thereto. However, the second storage container 160b and the third storage container 160c may have different sizes.

As described above, by withdrawing the moving rack 150 in the front direction from the case 130 and then lifting the storage containers 160a, 160b, and 160c up, the storage containers 160a, 160b, and 160c may be separated from the moving rack 150. Also, the storage containers 160a, 160b, and 160c may slide in the left-right direction on the moving rack 150. According to the structure, a user may arrange the storage containers 160a, 160b, and 160c on the moving rack 150 according to his/her preference. For example, FIG. 14 shows a case in which the first storage container 160a, the second storage container 160b, and the third storage container 160c are arranged in this order from left, however, the storage containers 160a, 160b, and 160c may be arranged in the order of the second storage container 160b, the first storage container 160a, and the third storage container 160c. Also, according to a user's desire, the user may separate the entire or a part of the storage containers 160 from the moving rack 150 and place foods directly on the moving rack 150.

Accordingly, a user's degree of freedom in arranging the storage containers 160 may be raised. Also, user convenience may be improved.

Figure 15:
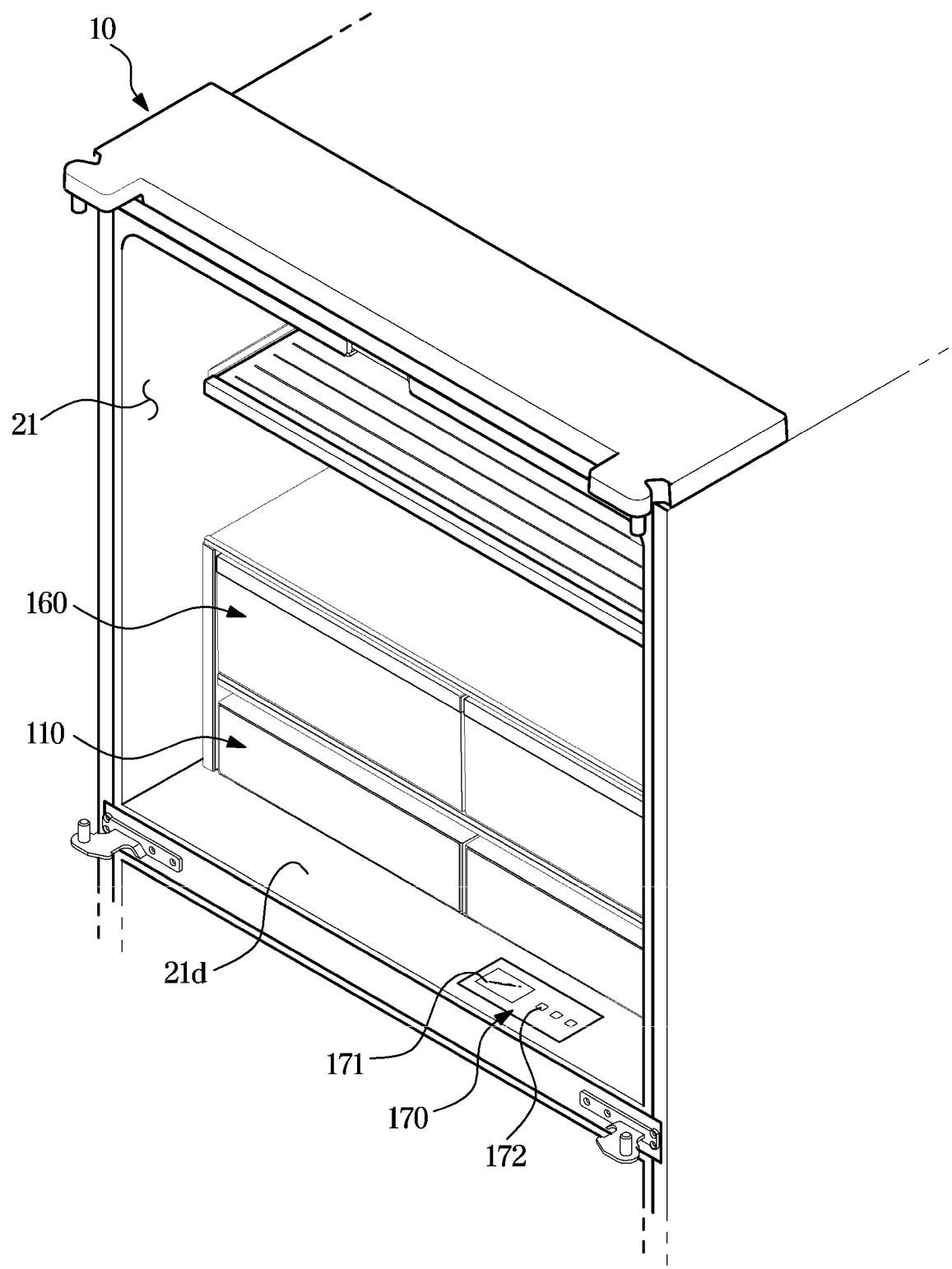
FIG. 15 shows a controller in a refrigerator according to an embodiment of the disclosure.

FIG. 15 shows a controller in a refrigerator according to an embodiment of the disclosure.

As shown in FIG. 15, according to an embodiment of the disclosure, a panel 21d on which a controller 170 is installed may be provided on the bottom 21b of the storage room 1. The panel 21d may be coupled with a front end of the bottom 21b, and the controller 170 may be positioned at one side of the panel 21d. The controller 170 may include a display 171 for displaying various information about the refrigerator 1 and/or the drawer 110, and an inputter 172 for enabling a user to input a command to the refrigerator 1 and/or the drawer 110.

Figure 16:
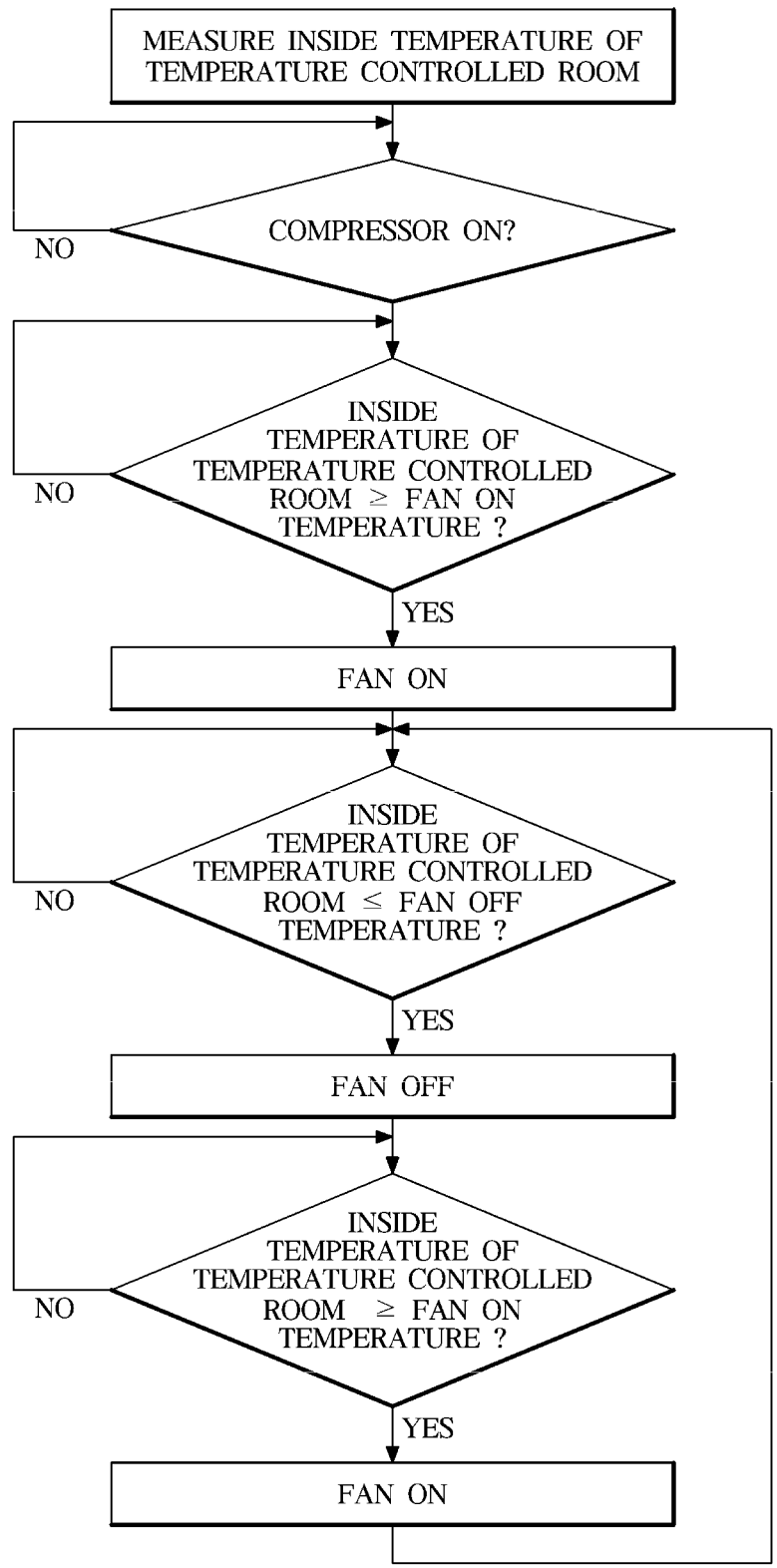
FIG. 16 is a flowchart schematically illustrating a process of cooling inside of a temperature controlled room based on inside temperature of the temperature controlled room, in a refrigerator according to an embodiment of the disclosure.

FIG. 16 is a flowchart schematically illustrating a process of cooling inside of a temperature controlled room based on inside temperature of the temperature controlled room, in a refrigerator according to an embodiment of the disclosure.

The temperature sensor 83b may measure inside temperature of the drawer 110. According to an embodiment of the disclosure, the fans 80a and 80b of the cool air supplier 80 may be set to operate upon operating of the compressor 2. According to an embodiment of the disclosure, the fans 80a and 80b may be set to operate in response to a user's selection of a meat and fish storage mode through the controller 170. The fans 80a and 80b may be set not to operate in response to a user's selection of a white wine storage mode, a grains storage mode, or a red wine storage mode. The above described settings may relate to a temperature range of the temperature controlled room 100, which will be described later.

Referring to FIG. 16, the temperature sensor 83b may determine, after measuring the inside temperature of the temperature controlled room 100, whether the compressor 2 operates. According to an embodiment of the disclosure, the fans 80a and 80b may be set to operate after the compressor 2 operates. Accordingly, in the case in which the compressor 2 does not operate, the fans 80a and 80b may not operate until the compressor 2 operates.

In the case in which the compressor 2 operates, it may be determined whether the inside temperature of the temperature controlled room 100, measured by the temperature sensor 83b, is higher than or equal to fan-on temperature set to operate the fans 80a and 80b. The fan-on temperature means a upper bound of a temperature range which the temperature controlled room 100 is set to reach. Also, fan-off temperature which will be described later means a lower bound of the temperature range which the temperature controlled room 100 is set to reach. The fan-on temperature and the fan-off temperature may have been set in advance.

In response to the inside temperature of the temperature controlled room 100 which is higher than or equal to the fan-on temperature, the fans 80a and 80b of the cool air supplier 80 may be turned on. The temperature controlled room 100 may include the first temperature controlled room 100a and the second temperature controlled room 100b, and two temperature sensors 83b may measure temperature of the first temperature controlled room 100a and temperature of the second temperature controlled room 100b, respectively. Therefore, the fans 80a and 80b may also operate independently according to temperature measured by the respective temperature sensors 83b.

After the fans 80a and 80b operate, it may be determined whether inside temperature of the temperature controlled room 100, measured by the temperature sensor 83b, is lower than or equal to the fan-off temperature.

In response to the inside temperature of the temperature controlled room 100 which is lower than or equal to the fan-off temperature, the fans 80a and 80b may be turned off.

After the fans 80a and 80b are turned off, it may be determined whether inside temperature of the temperature controlled room 100, measured by the temperature sensor 83b, is higher than or equal to the fan-on temperature.

In response to the inside temperature of the temperature controlled room 100 which is higher than or equal to the fan-on temperature, the fans 80a and 80b may be turned on.

After the fans 80a and 80b operate, it may be determined whether inside temperature of the temperature controlled room 100, measured by the temperature sensor 83b, is lower than or equal to the fan-off temperature. In this way, the above-described process may be repeated.

Therefore, as shown in FIG. 16, the cool air supplier 80 is operable to maintain or decrease an inside temperature of the temperature controlled room 100.

According to an embodiment of the disclosure, inside temperature of the temperature controlled room 100 may be maintained between the fan-on temperature and the fan-off temperature according to the above-described process.

Figure 17:
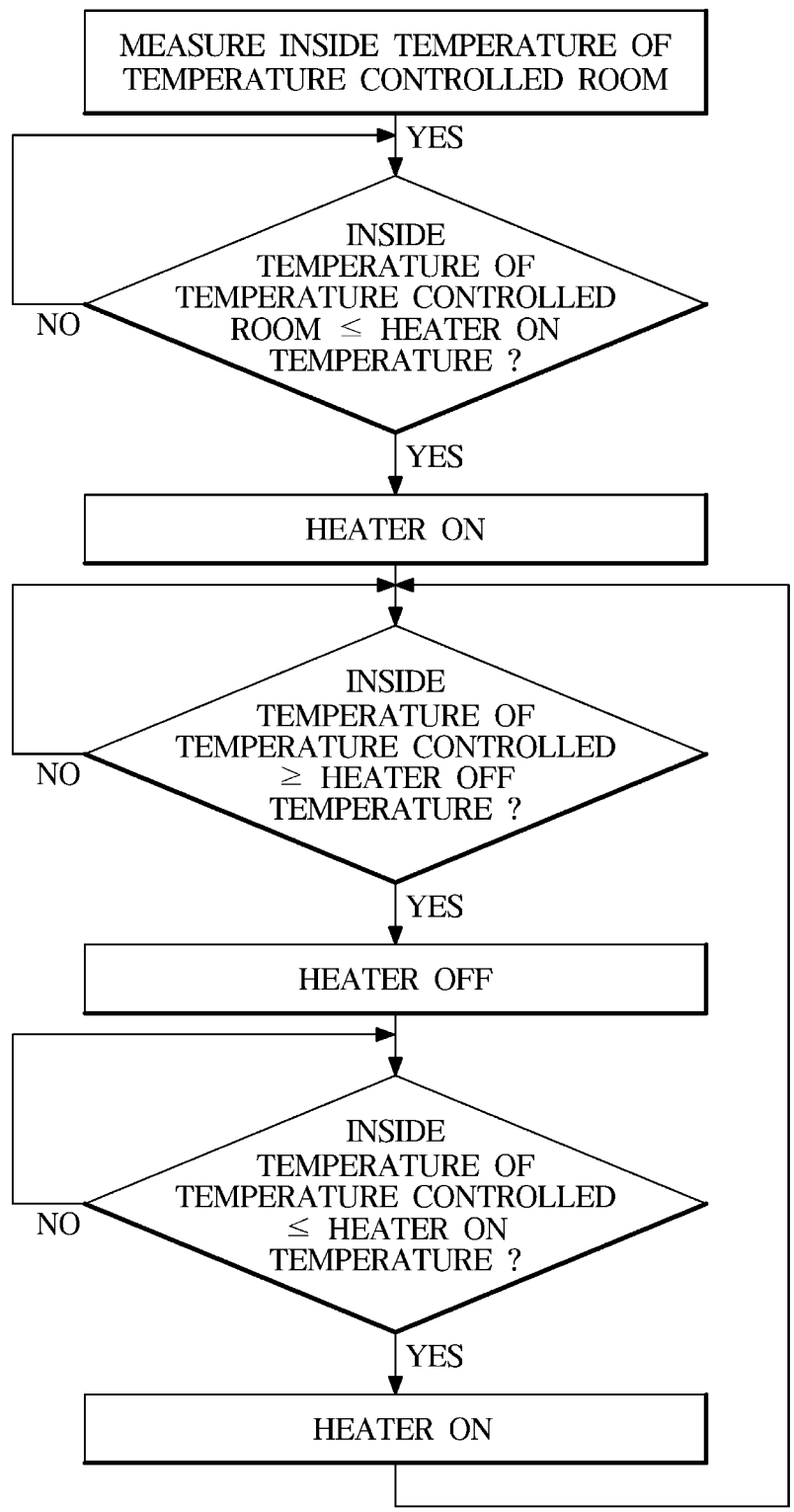
FIG. 17 is a flowchart schematically illustrating a process of heating inside of a temperature controlled room based on inside temperature of the temperature controlled room, in a refrigerator according to an embodiment of the disclosure.

FIG. 17 is a flowchart schematically illustrating a process of heating inside of a temperature controlled room based on inside temperature of the temperature controlled room, in a refrigerator according to an embodiment of the disclosure.

Referring to FIG. 17, the temperature sensor 83b may measure inside temperature of the temperature controlled room 100. According to an embodiment of the disclosure, the heating portion 90 may be set to operate in response to a user's selection of a white wine storage mode, a grains storage mode, a red wine storage mode, or a meat and fish storage mode through the controller 170. The heating portion 90 may be set not to operate in response to a user's selection of a fruits and vegetables storage mode through the controller 170. The above described settings may relate to a temperature range of the temperature controlled room 100, which will be described later.

It may be determined whether the inside temperature of the temperature controlled room 100, measured by the temperature sensor 83b, is lower than or equal to heater-on temperature set to operate the heating portion 90. The heater-on temperature means a lower bound of a temperature range which the temperature controlled room 100 is set to reach. Also, heater-off temperature which will be described later means a upper bound of the temperature range which the temperature controlled room 100 is set to reach. The heater-on temperature and the heater-off temperature may have been set in advance.

In response to the inside temperature of the temperature controlled room 100, measured by the temperature sensor 83b, which is lower than or equal to the heater-on temperature, the heating portion 90 may be turned on. The temperature controlled room 100 may include the first temperature controlled room 100a and the second temperature controlled room 100b, and two temperature sensors 83b may measure temperature of the first temperature controlled room 100a and temperature of the second temperature controlled room 100b, respectively. Therefore, the first heater 90a and the second heater 90b may also operate independently according to temperature measured by the respective temperature sensors 83b.

After the heating portion 90 operates, it may be determined whether inside temperature of the temperature controlled room 100, measured by the temperature sensor 83b, is higher than or equal to the heater-off temperature.

In response to the inside temperature of the temperature controlled room 100, measured by the temperature sensor 83b, which is lower than or equal to the heater-off temperature, the heating portion 90 may be turned off.

After the heating portion 90 is turned off, it may be determined whether inside temperature of the temperature controlled room 100, measured by the temperature sensor 83b, is lower than or equal to the heater-on temperature.

In response to the inside temperature of the temperature controlled room 100, measured by the temperature sensor 83b, which is lower than or equal to the heater-on temperature, the heating portion 90 may be turned on.

After the heating portion 90 operates, it may be determined whether inside temperature of the temperature controlled room 100, measured by the temperature sensor 83b, is higher than or equal to the heater-off temperature. In this way, the above-described process may be repeated.

Therefore, as shown in FIG. 17, the heating portion 90 is operable to maintain or increase an inside temperature of the temperature controlled room 100.

According to an embodiment of the disclosure, inside temperature of the temperature controlled room 100 may be maintained between the heater-on temperature and the heater-off temperature according to the above-described process.

Figure 18:
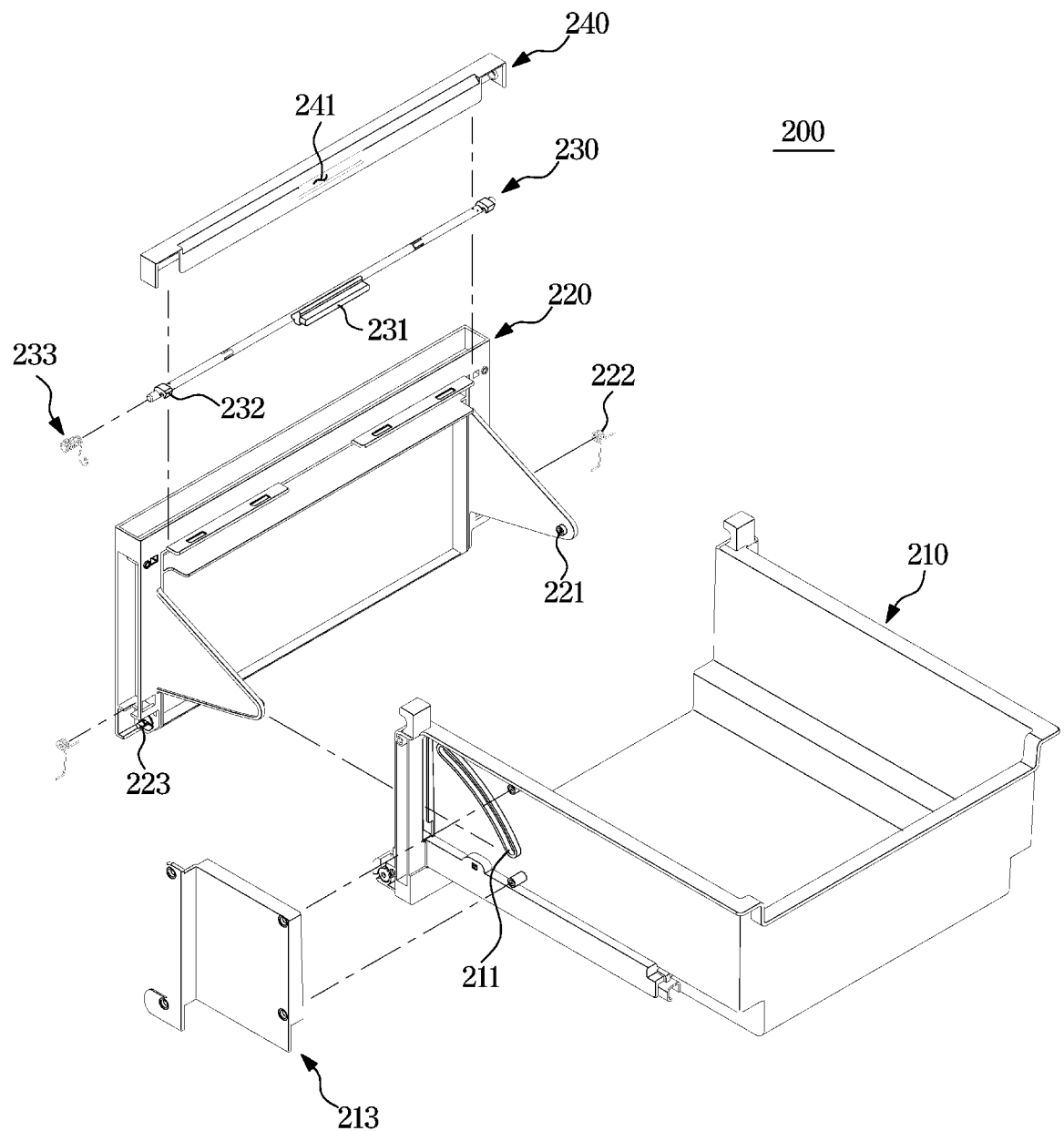
FIG. 18 is an exploded view of a temperature controlled room in a refrigerator according to another embodiment of the disclosure.
Figure 19:
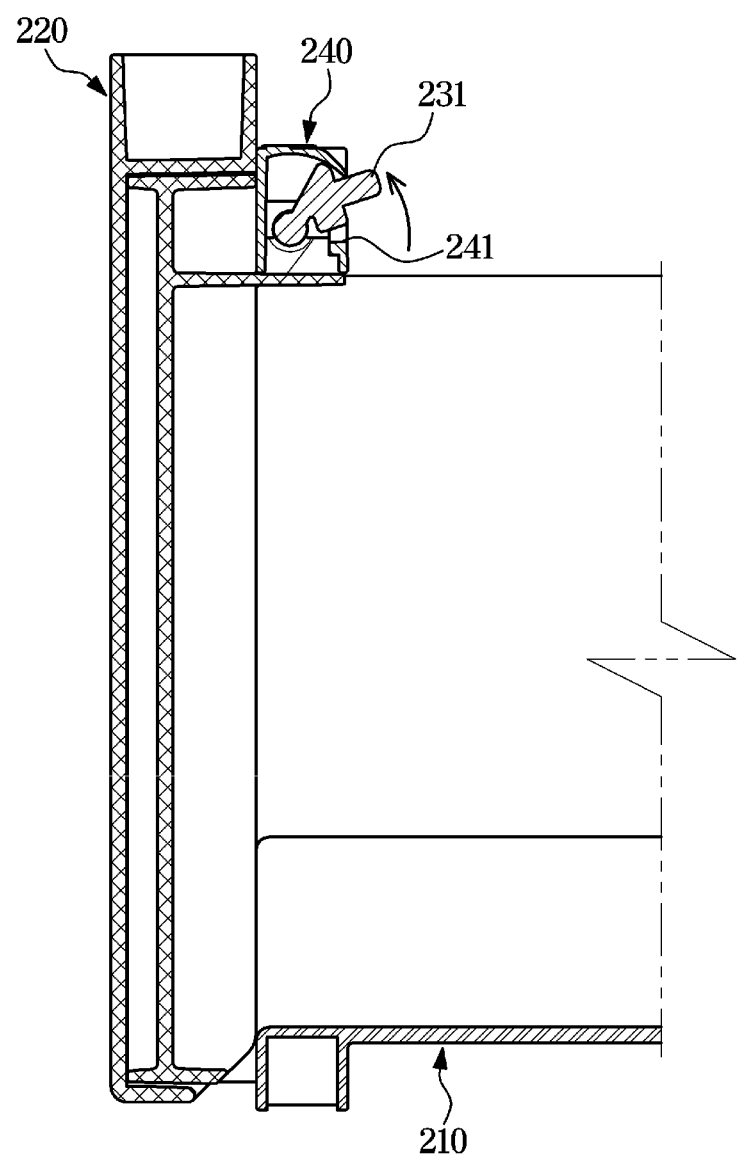
FIG. 19 is a cross-sectional view of the temperature controlled room shown in FIG. 18.
Figure 20:
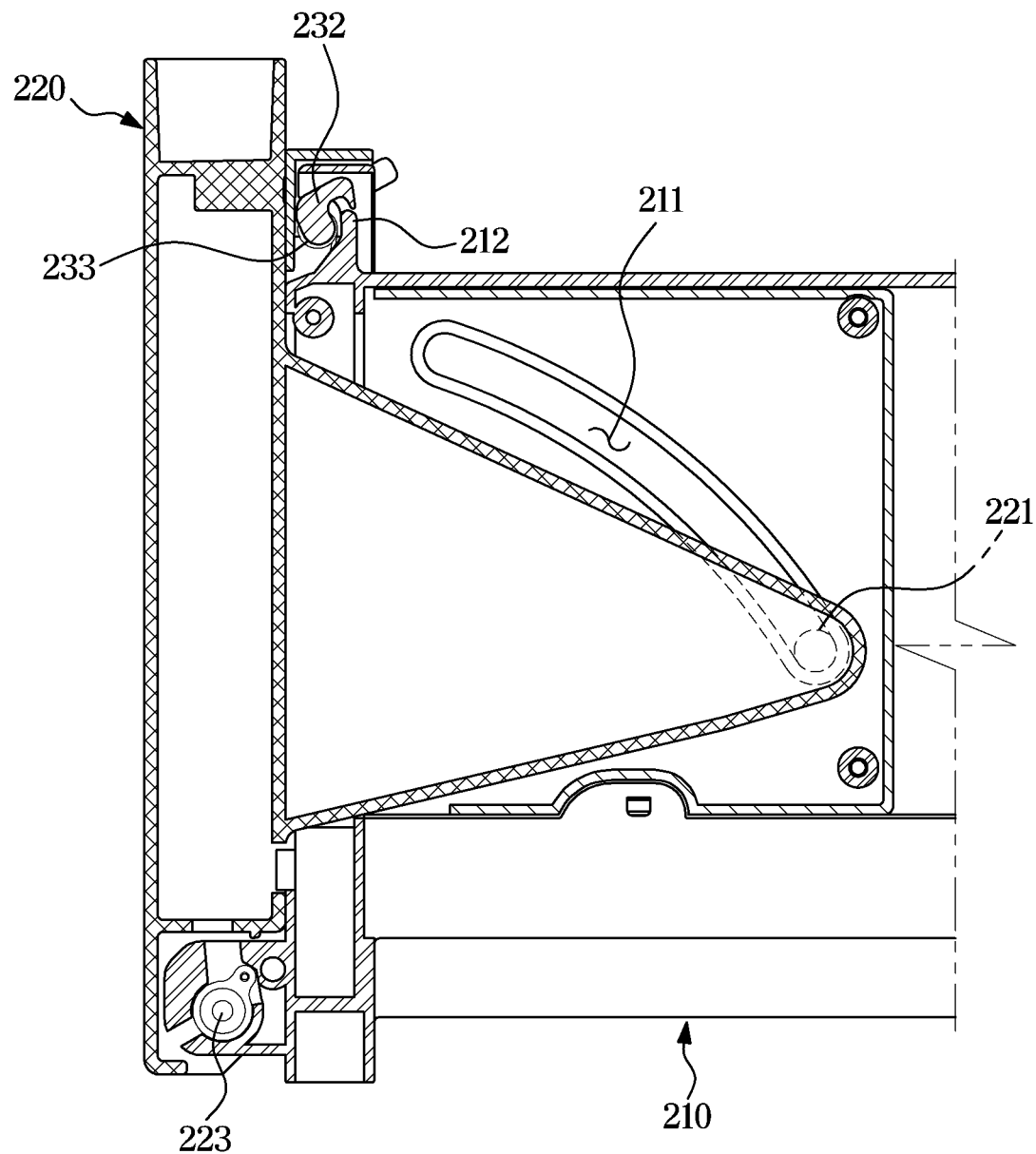
FIG. 20 is a cross-sectional view of the temperature controlled room shown in FIG. 18, before a cover rotates.
Figure 21:
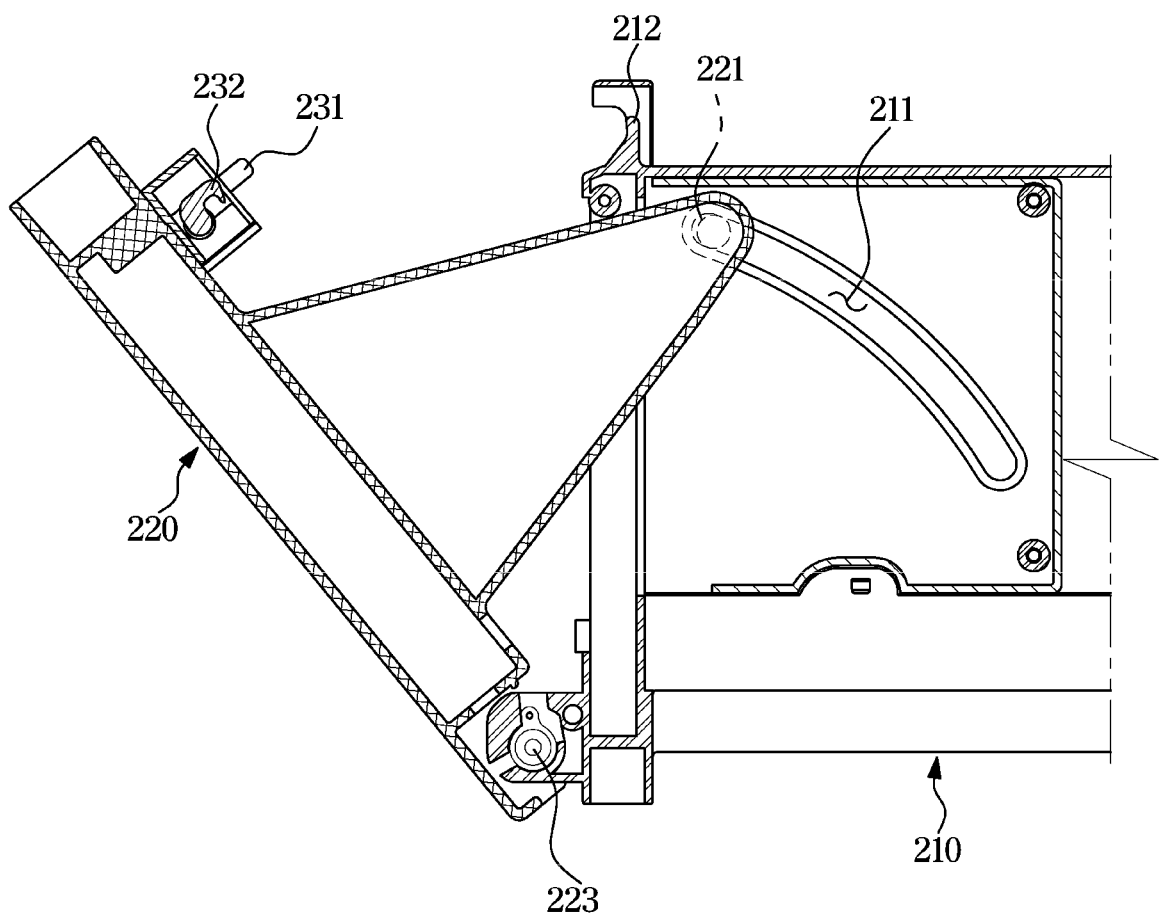
FIG. 21 is a cross-sectional view of the temperature controlled room shown in FIG. 18, after the cover rotates.

FIG. 18 is an exploded view of a temperature controlled room in a refrigerator according to another embodiment of the disclosure. FIG. 19 is a cross-sectional view of the temperature controlled room shown in FIG. 18. FIG. 20 is a cross-sectional view of the temperature controlled room shown in FIG. 18, before a cover rotates. FIG. 21 is a cross-sectional view of the temperature controlled room shown in FIG. 18, after the cover rotates.

Hereinafter, a temperature controlled room according to another embodiment of the disclosure will be described with reference to FIGS. 18 to 20.

According to another embodiment of the disclosure, a front side of a drawer 200 may be rotatable within a preset range. In other words, the front side of the drawer 200 may be tiltable.

Because the front side of the drawer 200 is rotatable, a user may accommodate foods in the drawer 200 through the open front side of the drawer 200, without completely withdrawing the drawer 200 from the case 130. Accordingly, user convenience may be improved.

The drawer 200 may include a body portion 210 for accommodating foods therein, and a cover 220 being rotatable within a preset range with respect to the body portion 210 and covering the open front side of the body portion 210.

The body portion 210 may include a guide groove 211 guiding a guide protrusion 221 which will be described later, at both sides. Also, the body portion 210 may further include a pair of guide groove covers 213 coupled with both side surfaces of the body portion 210 to prevent the guide groove 211 from being exposed to the both side surfaces of the body portion 210.

The cover 220 may include the guide protrusion 221 inserted in the guide groove 211 and moving along the guide groove 211. A pair of guide protrusions 221 may be provided to correspond to the guide grooves 211. Also, the cover 220 may include a shaft portion 223 functioning as a center of rotation upon coupling with the body portion 210.

The drawer 200 may include a first elastic member 222 for preventing the cover 220 from rotating too rapidly. The first elastic member 222 may provide an elastic force for returning the cover 220 to its original position in the case in which no external force is applied to the cover 220. The first elastic member 222 may provide an elastic force to the cover 220 in a direction of closing the open front side of the body portion 210.

A hook shaft 230 may be rotatably coupled with the cover 220. Also, a shaft support portion 240 for rotatably supporting the hook shaft 230 may be coupled with the cover 220.

The hook shaft 230 may include a switch protrusion 231, and a locking portion 232 including a locking groove in which a locking protrusion 212 of the body portion 210 is inserted. The switch protrusion 231 may protrude through a through hole 241 formed in the shaft support portion 240.

The drawer 200 may include a second elastic member 233 providing an elastic force for returning the switch protrusion 231 to its original position in the case in which no external force is applied to the switch protrusion 231. The second elastic member 233 may elastically bias the hook shaft 230 such that the hook shaft 230 rotates in one direction.

The first elastic member 222 and the second elastic member 233 may be torsion springs, although not limited thereto.

Referring to FIG. 19, a user may rotate the switch protrusion 231 in a counterclockwise direction to release locking between the locking portion 212 and the locking protrusion 212. As described above, because the switch protrusion 231 penetrates the through hole 241 to protrude outward, the switch protrusion 231 may rotate within a range of the through hole 241.

Referring to FIG. 20, the user may rotate the switch protrusion 231 in the counterclockwise direction to release locking between the locking portion 232 and the locking protrusion 212. More specifically, the locking protrusion 212 may be withdrawn from the locking groove of the locking portion 232.

Referring to FIG. 21, after locking between the locking portion 212 and the locking protrusion 212 is released, the cover 220 may rotate within a preset angle range. Rotating the cover 220 may be expressed as tilting the cover 220 in the front direction. Because the guide protrusion 221 moves in the guide groove 211, the cover 220 may rotate within the preset angle range with respect to the shaft portion 223. As a result of a movement of the guide protrusion 221 to one end of the guide groove 211, the cover 220 may no longer rotate and the drawer 200 may be withdrawn in the front direction of the case 130.

Figure 22:
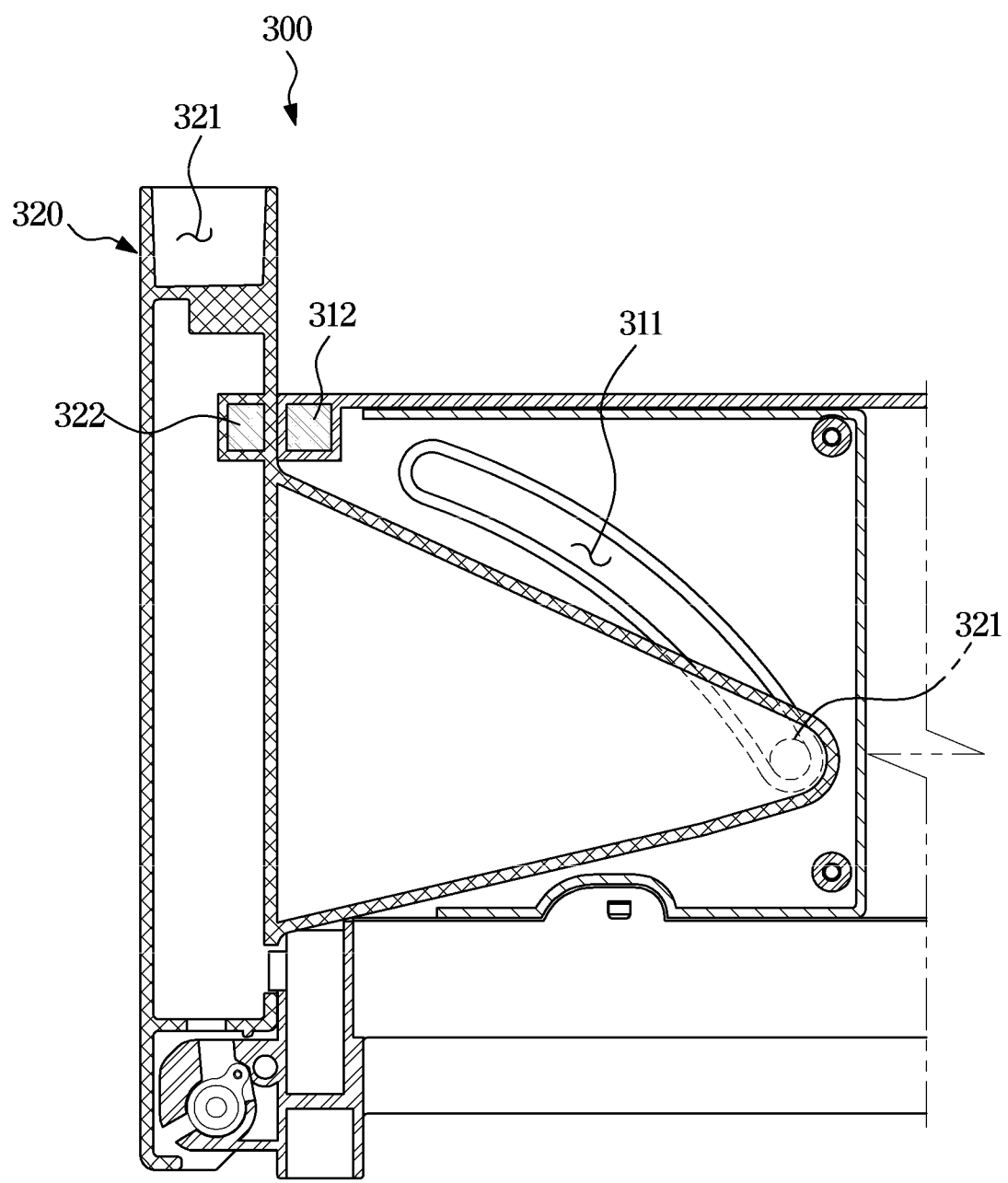
FIG. 22 is a cross-sectional view of a temperature controlled room in a refrigerator according to another embodiment of the disclosure.

FIG. 22 is a cross-sectional view of a temperature controlled room in a refrigerator according to another embodiment of the disclosure.

Referring to FIG. 22, according to another embodiment of the disclosure, a drawer 300 may include a cover 320 coupled with a body portion 310 by a magnetic force.

A magnet 322 may be provided inside the cover 320. Also, a magnetic body 312 may be provided at a location corresponding to the magnet 322 inside the body portion 310. However, a magnetic body may be provided inside the cover 320, and a magnet may be provided inside the body portion 310.

According to another embodiment of the disclosure, the cover 320 and the body portion 310 may be maintained in a coupled state by a magnetic force between the magnet 322 and the magnetic body 312. In the case in which a user pulls a handle 321 formed by a hollow top of the cover 322 with a force that is stronger than the magnetic force between the magnet 322 and the magnetic body 312, the cover 320 may rotate within the preset angle range with respect to the body portion 310.

According to an embodiment of the disclosure, a refrigerator with a wide controllable temperature range, while having high power efficiency because of using no thermoelectric device in implementing a temperature controlled room may be provided.

According to an embodiment of the disclosure, a refrigerator including a temperature controlled room with improved utilization of space because no component for cooling or heating is positioned inside a temperature controlled room may be provided.

According to an embodiment of the disclosure, a refrigerator including a fan for supplying cool air to inside of a storage room and a fan for supplying cool air to inside of a temperature controlled room are separately provided to quickly cool the inside of the temperature controlled room.

According to an embodiment of the disclosure, a refrigerator including a plurality of temperature controlled rooms to keep various foods at optimal temperature may be provided.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising:
   a cabinet;
   a storage room inside the cabinet;
   a case forming a temperature controlled room inside the storage room, and having a heater hole extending through a surface of the case;
   a drawer insertable into, and withdrawable from, the case;
   a cool air flow path to guide cool air generated inside the cabinet;
   a first fan to supply cool air guided by the cool air flow path to the storage room;
   a cool air supplier including a second fan to supply cool air, other than the cool air supplied to the storage room, guided by the cool air flow path to the temperature controlled room to maintain or decrease an inside temperature of the temperature controlled room; and
   a heater disposed in the heater hole to heat air in the temperature controlled room, or disposed adjacent to the heater hole to heat air in the temperature controlled room through the heater hole, to maintain or increase the inside temperature of the temperature controlled room,
   to thereby allow the inside temperature of the temperature controlled room to be independently controlled with respect to an inside temperature of the storage room.

2. The refrigerator according to claim 1, further comprising:
   a heat exchanger inside the storage room to generate the cool air guided by the cool air flow path, wherein the cool air supplier is in front of the heat exchanger.

3. The refrigerator according to claim 2, wherein the first fan is above the heat exchanger, and the second fan is in front of the heat exchanger.

4. The refrigerator according to claim 1, wherein
   the cool air supplier further includes a cool air supply flow path having one end connected to the cool air flow path, and an other end connected to the temperature controlled room, and
   before the cool air supplied to the temperature controlled room enters the temperature controlled room, the cool air is guided by the cool air supply flow path.

5. The refrigerator according to claim 4, wherein:
   the case includes a case hole passing through a rear side of the case, and
   the other end of the cool air supply flow path is connected to the case hole.

6. The refrigerator according to claim 1,
   wherein the second fan is outside the case.

7. The refrigerator according to claim 1, wherein the case and the drawer are separable from the storage room.

8. The refrigerator according to claim 1, wherein the drawer is spaced a preset distance from the heater such that the drawer is not in contact with the heater.

9. The refrigerator according to claim 1, wherein
   the surface of the case is a bottom surface of the case.

10. The refrigerator according to claim 1, wherein
    the temperature controlled room includes a first temperature controlled room and a second temperature controlled room,
    the second temperature controlled room is partitioned from the first temperature controlled room, and
    an inside temperature of the second temperature controlled room is controllable to be different from inside temperature of the first temperature controlled room.

11. The refrigerator according to claim 1, wherein
    the cool air supplier includes a plate portion spaced a preset distance from a surface of the storage room to form at least one portion of the cool air flow path, and
    the second fan is coupled to the plate portion so as to be positioned on an outer side of the cool air flow path.

12. The refrigerator according to claim 1, wherein the heater is disposed in the heater hole.

13. The refrigerator according to claim 1, wherein the heater is disposed adjacent to the heater hole.

14. A refrigerator comprising:
    a cabinet;
    a storage room inside the cabinet;
    a case forming a temperature controlled room inside the storage room, and having a heater hole in a bottom surface of the case and that extends through the bottom surface of the case;
    a drawer that is insertable into, and withdrawable from, the case;
    a heat exchanger inside the cabinet to generate cool air;
    a cool air supplier to supply the cool air generated by the heat exchanger to the temperature controlled room to maintain or decrease an inside temperature of the temperature controlled room; and
    a heater disposed in the heater hole to heat air in the temperature controlled room, or disposed adjacent to the heater hole to heat air in the temperature controlled room through the heater hole, to maintain or increase the inside temperature of the temperature controlled room,
    to thereby allow the inside temperature of the temperature controlled room to be independently controlled with respect to an inside temperature of the storage room.

15. The refrigerator according to claim 14, wherein
    the cool air supplier includes a first fan to supply the cool air to the temperature controlled room, and
    the refrigerator further comprises a second fan to supply cool air, other than the cool air supplied to the temperature controlled room, generated by the heat exchanger to the storage room.

16. The refrigerator according to claim 15, wherein the first fan is positioned outside the temperature controlled room.

17. The refrigerator according to claim 14, wherein the cool air supplier covers a front portion of the heat exchanger to partition the heat exchanger from the storage room.

18. The refrigerator according to claim 14, wherein
the cool air supplier includes a cool air supply flow path through which the cool air generated by the heat exchanger is guided to the temperature controlled room, and
one end of the cool air supply flow path is connected to a front portion of the heat exchanger, and an other end of the cool air supply flow path is connected to the temperature controlled room.

19. The refrigerator according to claim 14, wherein the heater is disposed in the heater hole.

20. The refrigerator according to claim 14, wherein the heater is disposed adjacent to the heater hole.

\* \* \* \* \*